(12) United States Patent  
Nozaki

(10) Patent No.: US 8,237,805 B2
(45) Date of Patent: Aug. 7, 2012

(54) IMAGE PROCESSING DEVICE THAT EXECUTES AN IMAGE PROCESS OF MATCHING TWO IMAGES WITH EACH OTHER, AND A NON-TRANSITORY COMPUTER-READABLE MEDIUM THAT STORES A PROGRAM THAT CAUSES A COMPUTER TO OPERATE AS THE IMAGE PROCESSING DEVICE

(75) Inventor: Tomoko Nozaki, Kawasaki (JP)

(73) Assignee: FUJIFILM Corporation, Tokyo (JP)

( * ) Notice: Subject to any disclaimer, the term of this patent is extended or adjusted under 35 U.S.C. 154(b) by 1069 days.

(21) Appl. No.: 12/136,141

(22) Filed: Jun. 10, 2008

(65) Prior Publication Data

US 2008/0309783 A1    Dec. 18, 2008

(30) Foreign Application Priority Data

Jun. 13, 2007   (JP) .................................. 2007-156674

(51) Int. Cl.
*H04N 5/228*   (2006.01)
(52) U.S. Cl. ................. 348/208.99; 348/208.2; 382/107; 382/130; 382/218
(58) Field of Classification Search .................. 382/128, 382/294, 107, 130, 218; 348/208.99, 208.2
See application file for complete search history.

(56) References Cited

U.S. PATENT DOCUMENTS

| 5,872,604 | A  | * | 2/1999 | Ogura | ............................ 348/699 |
| 6,731,818 | B1 | * | 5/2004 | Conklin | ........................ 382/254 |
| 7,400,344 | B2 | * | 7/2008 | Ito et al. | ........................ 348/169 |
| 7,702,184 | B2 | * | 4/2010 | Aiso | .............................. 382/299 |
| 7,760,237 | B2 | * | 7/2010 | Usui | ........................ 348/208.99 |
| 7,953,297 | B2 | * | 5/2011 | Aiso | .............................. 382/299 |
| 2004/0125984 | A1 | * | 7/2004 | Ito et al. | ........................ 382/103 |
| 2005/0163402 | A1 | * | 7/2005 | Aiso | .............................. 382/300 |
| 2005/0213663 | A1 | * | 9/2005 | Aoyama et al. | .......... 375/240.16 |
| 2006/0028554 | A1 | * | 2/2006 | Usui | ........................ 348/208.99 |
| 2009/0052551 | A1 | * | 2/2009 | Kitamura | ................. 375/240.26 |
| 2009/0143676 | A1 | * | 6/2009 | Matsumura | ................... 600/438 |
| 2009/0161763 | A1 | * | 6/2009 | Rossignol et al. | ....... 375/240.16 |
| 2009/0207259 | A1 | * | 8/2009 | Ito et al. | .................... 348/208.4 |
| 2010/0150243 | A1 | * | 6/2010 | Kure et al. | ............... 375/240.24 |
| 2010/0150474 | A1 | * | 6/2010 | Aiso | .............................. 382/284 |

FOREIGN PATENT DOCUMENTS

| JP | 2002-032735 A | 1/2002 |
| JP | 2002-032764 A | 1/2002 |
| JP | 2003-244542 A | 8/2003 |

* cited by examiner

*Primary Examiner* — David Ometz
*Assistant Examiner* — Antoinette Spinks
(74) *Attorney, Agent, or Firm* — Sughrue Mion, PLLC

(57) ABSTRACT

An image processing device includes an image receiving section that receives two medical images, which are imaged at different imaging times, of a same examination object; a time difference acquiring section that acquires a difference between the imaging times of the two images; a global matching section and a local matching section that execute a matching process for the two medical images upon setting of a parameter value. The matching process causes the two images to match each other by moving and deforming one of the two images. The amount of the movement or the deformation necessary for matching is in an application range that is dependant on the parameter value. Also provided is a parameter setting section that sets a value corresponding to the difference between the imaging times acquired in the time difference acquiring section to the processing section as the parameter value.

5 Claims, 16 Drawing Sheets

T1

| IMAGING TIME INTERVAL (SEC) | ANGULAR RANGE | MOVEMENT RANGE | INITIAL TEMPLATE SIZE | SEARCH RANGE SIZE | NUMBER OF ITERATIONS |
|---|---|---|---|---|---|
| 0.2 | 0 | 4 | N=125 | A1=2 | 1 |
| 0.5 | 0.5 | 8 | N=120 | A1=4 | 2 |
| 0.7 | 1.0 | 20 | N=100 | A1=10 | 3 |
| ⋮ | ⋮ | ⋮ | ⋮ | ⋮ | ⋮ |

Fig. 13

IMAGE PROCESSING DEVICE THAT EXECUTES AN IMAGE PROCESS OF MATCHING TWO IMAGES WITH EACH OTHER, AND A NON-TRANSITORY COMPUTER-READABLE MEDIUM THAT STORES A PROGRAM THAT CAUSES A COMPUTER TO OPERATE AS THE IMAGE PROCESSING DEVICE

BACKGROUND OF THE INVENTION

1. Field of the Invention

The present invention relates to an image processing device that executes an image process of matching two images with each other. The invention further relates to an image processing program storage medium storing an image processing program that causes a computer to operate as the image processing device.

2. Description of the Related Art

In the field of medical treatment, medical images taken of body portions of examination objects by using x-rays or the like are popularly utilized for diagnosis of disease conditions of the examination objects. With the utilization of medical images for diagnosis, the progress or the like of a disease condition of an examination object can be ascertained without exterior damage being caused on the examination object. Thus, information necessary for determining treatment policies or directions can easily be obtained.

In addition, in recent years, there have been popularly utilized apparatuses that acquire digital medical images. The apparatuses are, for example, computed radiography (CR) apparatuses that acquire digital medical images by using x-rays, computerized tomography (apparatus) apparatuses that acquire tomographic images of examination objects by using x-rays, and magnetic resonance imaging (MRI) apparatuses that acquire tomographic images of examination objects by using intense magnetic fields. Thus, digital medical images are generally utilized in lieu of medical images that have been acquired by using conventional films such as x-ray films.

With the digitization of medical images, diagnosis can be performed more effectively than in conventional cases by applying image processes to medical images. Among such image processes being applied to medical images, there is an image process called an energy subtraction (ES) process, which is one of processes having drawn attention in recent years. The ES process is an image process in which, of two medical images acquired using x-rays having levels of energy different from each other, an operation is done to subtract pixel values in the other of the medical images from pixel values of one of the medical images by allocating predetermined weights thereto. Thereby, in a body structure of an examination object captured on the former medical image, an image region in a site having a specific absorption property against the x-ray is erased. According to the ES process, a soft tissue portion image formed only of soft tissue image regions can be obtained by erasing bone image regions from the medical image, and conversely, a bone portion image formed only of bone image regions can be obtained by erasing the soft tissue image regions from the medical image. As a consequence, a disease focus hidden by bone, a disease focus existing in bone, and the like are likely to be interpreted or examined, thereby making it possible to perform effective diagnosis.

In order that the ES process is executed with high accuracy, it is preferable that two medical images match each other. In recent years, in the field of x-ray imaging, imaging using a so-called "flat panel detector" (FPD) including x-ray detection elements two-dimensionally arrayed is popularly performed. However, in imaging using such an FPD, one medical image is acquired by one imaging process, so that, when two medical images are acquired, the imaging times, i.e., times when imaging process is performed for each of two medical images, are inevitably different from each other. Hence, depending on the case, two images do not always match each other because of, for example, the posture or breathing of an examination object. In a case where two images do not match each other, when the ES process is forcibly applied thereon, inherently unpresent ghost image regions (artifacts) appear in mismatch portions between the two images, thereby hindering the examination.

Under these circumstances, techniques for performing an image process are proposed in which, of two medical image to be subjected to the ES process or the like, one of the images is warped and thereby matched with the other image (refer to Japanese Patent Application Publications Nos. 2002-32735, 2002-32764, and 2003-244542, for example).

Nevertheless, however, under the present circumstances, even by an image process such as described above, a sufficient match between two medical images cannot be obtained, and hence there frequently occur ghost image regions (artifacts) in the ES process.

SUMMARY OF THE INVENTION

The present invention has been made in view of the above circumstances and provides an image processing device that is capable of executing an image process that matches two images with high accuracy, and an image processing program storage medium storing an image processing program that causes a computer to operate as such an image processing device.

An image processing device according to one example of the present invention includes:

an image receiving section that receives a plurality of photographic images of a same examination object, the photographic images being imaged at imaging times different from one another;

a time difference acquiring section that acquires a difference between the imaging times of the plurality of photographic images;

a processing section that executes a matching process for two photographic images of the plurality of photographic images upon setting of a predetermined parameter value, the matching process performing movement and deformation of one or both of the two images in accordance with the predetermined parameter value, an amount of the movement or of the deformation necessary for matching the two photographic images being in an application range dependant on the parameter value; and a parameter setting section that sets a value corresponding to the difference between the imaging times acquired in the time difference acquiring section to the processing section as the parameter value.

As the difference between the imaging times is larger, there occurs an increase in the probability that image mismatches occur between the photographic images because of the movement of the examination object, for example. This is one cause of disabling a sufficient match in images between two medical images even in the conventional image process described above, for example. According to the image processing device of the present invention, the value corresponding to the difference between the imaging times acquired in the time difference acquiring section is set as the parameter value, matching between the two images is executed on the basis of the movement or deformation of the image in accordance with the amount of the movement or amount of the deformation in the application range that depends upon the parameter. As such, according to the image processing device of one example of the present invention, the amount of image mismatches corresponding to the difference between the imaging times is predicted, thereby making it possible to match the two images with each other with high accuracy.

In the image processing device of one example of the present invention, it is preferable that the processing section searches for matching parts in one of the two photographic images that pictorially and respectively match predetermined parts in the other of the two photographic images, and transforms one or both of the two photographic images at each portion of the image to align the matching parts with the predetermined parts, the predetermined parts having an area size set as the parameter value and being used for the searching; and the parameter setting section sets the area size of the predetermined parts to be smaller as the difference between the imaging times is larger.

According to the image processing device of the preferable example, the matching process that matches the two images with each other is executed for the each predetermined portion. In this case, the matching process is executed by use of the predetermined portion having an appropriate area size corresponding to the difference between the imaging times.

FIG. 14 shows views showing a manner in which one example of the matching process for two images is performed by use of a predetermined portion having an appropriate area size corresponding to an imaging time difference.

Part (a) of FIG. 14 shows a view corresponding to a case where the difference between the imaging times is small and hence the amount of image mismatches between two images A1 and A2 is small. Part (b) of FIG. 14 shows a view corresponding to a case where the difference between the imaging times is large and hence the amount of image mismatches between two images A1 and A2 is large.

For example, when, as shown in Part (b) of FIG. 14, the difference between the imaging times is large and the amount of image mismatches in the images is large, the mismatch states may be different in respective portions. Hence, it is preferable to execute the matching process utilizing even more local nonlinear deformation. On the other hand, when, as shown in Part (a) of FIG. 14, the difference between the imaging times is small and hence the amount of image mismatches is small, a large number of portions in similar mismatch states are present in the image. Hence, it is preferable to execute a matching process utilizing even more comprehensive deformation. According to the image processing device of the preferable example, when the difference between the imaging times is large, a predetermined portion B having a relatively small area size is used, as shown in Part (b) of FIG. 14, to thereby execute the matching process utilizing the local nonlinear deformation. On the other hand, when the difference between the imaging times is small, a predetermined portion B2 having a relatively large area size is used, as shown in Part (a) of FIG. 14, to thereby execute the matching process utilizing the comprehensive nonlinear deformation.

Thus, according to the image processing device of the preferable example, the matching process is executed by use of the predetermined portion having the appropriate area size corresponding to the difference between the imaging times. Thereby, the diversity in the mismatch state of the image due to the difference between the imaging times can be addressed, and hence the matching process with even higher accuracy can be executed. In addition, since the process period of time necessary for the matching process depends on the area size of the predetermined portion, the matching process can be executed in an appropriate process period of time.

Further, in the image processing device of one example of the present invention, it is preferable that the processing section searches for matching parts in one of the two photographic images that pictorially and respectively match predetermined parts in the other of the two photographic images, and transforms one or both of the two photographic images at each portion of the image to align the matching parts with the predetermined parts, the searching for the matching parts being performed in a searching range having an area size set as the parameter value; and the parameter setting section sets the searching range of searching for the matching parts to be larger as the difference between the imaging times is larger.

Even in the image processing device of the preferable example, the matching process that matches the two images with each other is executed for the each predetermined portion. In this case, the search for the matching portion in the matching process is executed in the search range having an appropriate area size corresponding to the difference between the imaging times.

With reference FIG. 14, the following describes that the search for the matching portion of the two images in the matching process is executed in the search range having an appropriate area size corresponding to the difference between the imaging times.

For example, when, as shown in Part (b) of FIG. 14, the difference between the imaging times is large and the amount of image mismatches is large, there is a high probability that such a matching portion is present far apart from the position of the predetermined portion, so that it is preferable to execute a search in a larger range. On the other hand, when, as shown in Part (a) of FIG. 14, the difference between the imaging times is small and the amount of image mismatches is small, there is a high probability that such a matching portion is present near the position of the predetermined portion, so that it is preferable to execute a search in a more limited range. According to the image processing device of the preferable example, when the difference between the imaging times is large, the search can be performed in a search range C1 having a relatively large area size, as shown in Part (b) of FIG. 14. On the other hand, when the difference between the imaging times is small, the search can be performed in a search range C2 having a relatively small area size, as shown in Part (a) of FIG. 14.

Thus, according to the image processing device of the preferable example, the search is performed in the search range having an appropriate area size corresponding to the difference between the imaging times. This prevents undesirable cases such as, for example, a case where a matching portion to be detected falls out of the search range and a case where a different portion with a better matchability than a matching portion to be detected is incidentally detected, consequently enabling the matching process with even higher accuracy to be executed. Further, since the process period of time necessary for the matching process depends also on the area size of the search range (region), the matching process can be executed in an appropriate process period of time.

Further, in the image processing device of one example of the present invention, it is preferable that the processing section searches for matching parts in one of the two photographic images that pictorially and respectively match predetermined parts in the other of the two images, and transforms one or both of the two photographic images at each portion of the image to align the matching parts with the predetermined parts, the searching for the matching parts being repeated by changing an area size of the predetermined parts for the number of times set as the parameter value; and the parameter setting section sets the number of times for searching the matching parts to be larger as the difference between the imaging times is larger.

Even in the image processing device of the preferable example, the matching process that matches the two images with each other is executed for the each predetermined portion. In the image processing device of the preferable example, the search for the matching portion is repeated while changing the area size of the predetermined portion, thereby making it possible to accomplish improvement of the processing accuracy. Further, the search is iterated appropriate number of times corresponding to the difference between the imaging times.

FIG. 15 shows views showing one example of a manner in which the matching process for two images is performed through an appropriate number of searches for a matching portion in correspondence to the difference between the imaging times.

Part (a) of FIG. 15 shows a view corresponding to a case where the difference between the imaging times is small and hence the amount of image mismatches between two images A1 and A2 is small. Part (b) of FIG. 15 shows a view corresponding to a case where the difference between the imaging times is large and hence the amount of image mismatches between two images A1 and A2 is large.

For example, when, as shown in Part (b) of FIG. 15, the difference between the imaging times is large and the amount of image mismatches in the images is large, it is preferable to execute the local matching process, as described above. However, when attempting to perform a search for a matching portion matching with a local portion by specifying the local portion from the beginning, there can occur a case where a position with a better matchability than a position necessary to be inherently detected is incidentally detected. According to the preferable example, since the search for the matching portion is iterated while changing the area size of the predetermined portion, the matching portion is roughly searched for the matching portion by initially specifying a relatively large, predetermined portion, whereby the local matching portion to be detected can be reached while the area size of the predetermined portion is being progressively narrowed. Part (b) of FIG. 15 shows a relatively large, predetermined portion B3 initially specified, a relatively large matching portion D1_1 searched for in the predetermined portion B3, a slightly small matching portion D1_2 searched for in a predetermined portion (not shown) slightly smaller than the relatively large, predetermined portion B3, and a local matching portion D1_3 searched for in a further smaller predetermined portion (not shown). Thus, in the example of Part (b) of FIG. 15, the local matching portion is detected through three times of the search (or, three searches). It is preferable that the number of times of the search is larger as the difference between the imaging times is larger and the amount of image mismatches is larger. On the other hand, when, as shown in Part (a) of FIG. 15, the difference between the imaging times is small and the amount of image mismatches is small, it is preferable to execute a comprehensive matching process, as described above. In the matching process, the number of cases where matching portions to be detected in the search in the relatively large, predetermined portion is large, so that it is preferable to perform the search efficiently in a small number of times. According to the image processing device of the preferable example, when the difference between the imaging times is large, the search can be performed in a relatively large number of times (three times in the example shown of Part (b) of FIG. 15); and when the difference between the imaging times is small, the search can be performed in a relatively small number of times (one time in the example shown of Part (a) of FIG. 15).

Thus, according to the image processing device of the preferable example, it is possible to prevent undesirable incidents, such as search insufficiency in the case where the difference between the imaging times is large, and unnecessary search iterations in the case where, conversely to the above, the difference between the imaging times is small and the amount of image mismatches is small. Consequently, the local matching process can be executed with high accuracy and efficiency.

In the image processing device of the example of the present invention, it is preferable that the processing section moves or deforms the one or both of the two photographic images by using a linear coordinate transformation for an image to match the two photographic images, an amount of the movement and the deformation being within a permissible range set as the parameter value; and the parameter setting section sets the permissible range to be larger as the difference between the imaging times is larger.

According to the image processing device of the preferable example, the matching process through the image movement or deformation by using the linear coordinate transformation is executed. In this case, the movement or deformation is performed within an appropriate permissible range corresponding to the difference between the imaging times.

FIG. 16 shows views showing one example of a manner in which the matching process for two images is performed through movement within an appropriate permissible range corresponding to the difference between the imaging times.

In FIG. 16, in order to simplify the description, mismatches occurred in the manner that the other image is horizontally slid in the views with respect to the one image are shown as an example of image mismatches between two images A1 and A2. Part (a) of FIG. 16 shows a view corresponding to a case where the difference between the imaging times is small and hence the amount of image mismatches between the two images A1 and A2 is small. Part (b) of FIG. 16 shows a view corresponding to a case where the difference between the imaging times is large and hence the amount of image mismatches between the two images A1 and A2 is large.

For example, when, as shown in Part (b) of FIG. 15, the difference between the imaging times is large and the amount of image mismatches in the images is large, it is preferable to move the one image in a wide range, thereby to securely search for position where the one image matches with the other image. On the other hand, when, as shown in Part (a) of FIG. 15, the difference between the imaging times is small and the amount of image mismatches is small, it is preferable to reduce the movement range, thereby to efficiently search for the position where the one image matches with the other image. According to the image processing device of the preferable example, when the difference between the imaging times is large, as shown in Part (b) of FIG. 16, the movement or the like of the image can be performed within a relatively large permissible range D1. On the other hand, when the difference between the imaging times is small, as shown in Part (a) of FIG. 16, the movement or the like of the image can be performed within a relatively small permissible range D2.

Thus, according to the image processing device of the preferable example, undesirable incidents, such as insufficiency and excessiveness in the movement or deformation of the image can be prevented, whereby the matching process can be executed with high accuracy and efficiently.

Further, according to another example of the present invention, an image processing program storage medium stores an image processing program that is incorporated in a computer and causes the computer to build on the computer:

an image receiving section that receives a plurality of photographic images of a same examination object, the photographic images being imaged at imaging times different from one another;

a time difference acquiring section that acquires a difference between the imaging times of the plurality of photographic images;

a processing section that executes a matching process for two photographic images of the plurality of photographic images upon setting of a predetermined parameter value, the matching process performing movement and deformation of one or both of the two images in accordance with the predetermined parameter value, an amount of the movement or of the deformation necessary for matching the two photographic images being in an application range dependant on the parameter value; and a parameter setting section that sets a value corresponding to the difference between the imaging times acquired in the time difference acquiring section to the processing section as the parameter value.

According to the image processing program storage medium, the image processing device that executes the image process that matches two images with each other can easily be realized.

While basic configuration items of the image processing program are shown, the program will not be described in further detail herein for avoiding duplicated descriptions. However, the image processing program includes not only the basic features, but also various features corresponding to the respective features of the image processing device described above.

Further, components, such as the image receiving section that is built by the image processing program in the computer, may be such that one component is built by one program component. Alternatively, one component may be built by two or more program components; or still alternatively, two or more components may be built by one program component. Further, these components may be built as those in which such operations are executed by themselves. Alternatively, the components may be built as those that are executed in the manner that instructions are issued to, for example, other programs or program components incorporated in the computer.

As described above, according to the present invention, the image processing device is capable of executing the image process that matches two images with each other with high accuracy and the image processing program for causing the computer to operate as the image processing device can be obtained.

Figure 7:
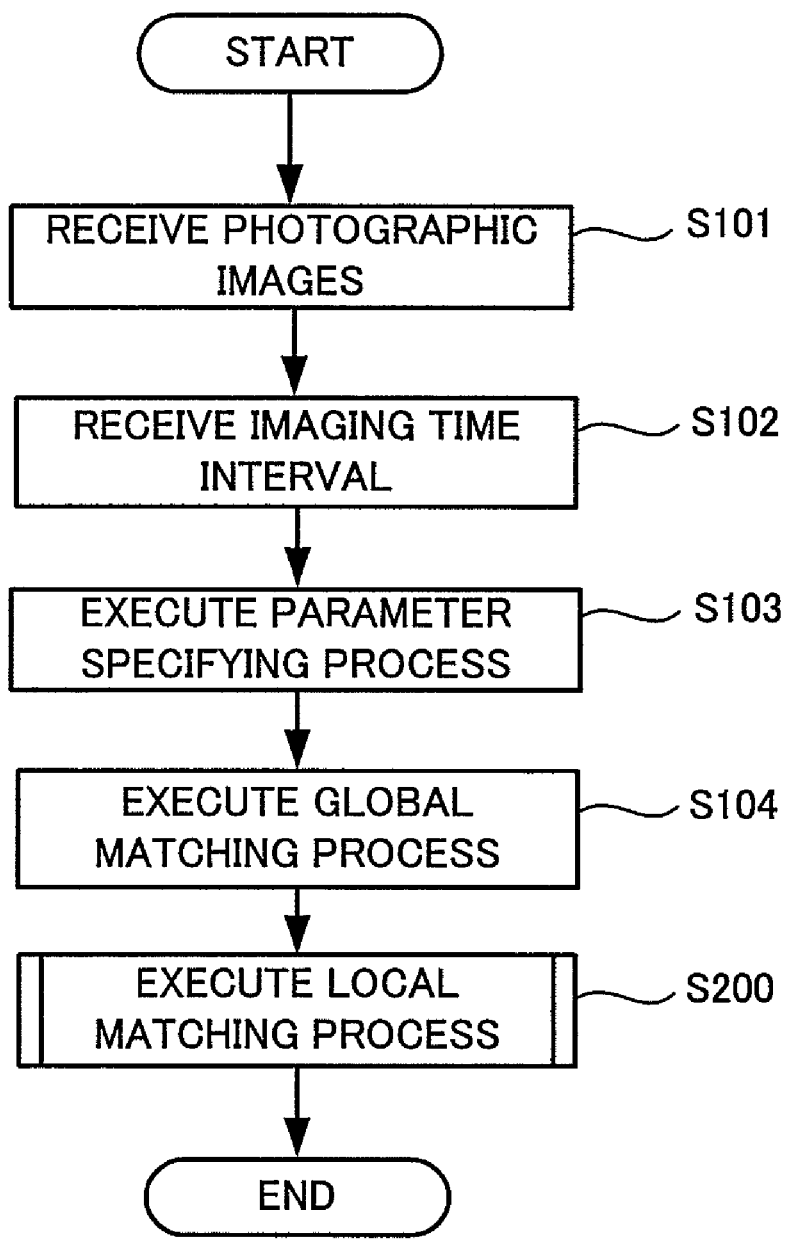
FIG. 7 is a flowchart showing the flow of a series of processes that, in the image processing device shown in FIG. 5, receives two medical images (first and second medical images (G1 and G2)) and matches the second medical image (G2) with the first medical image (G1)
Figure 8:
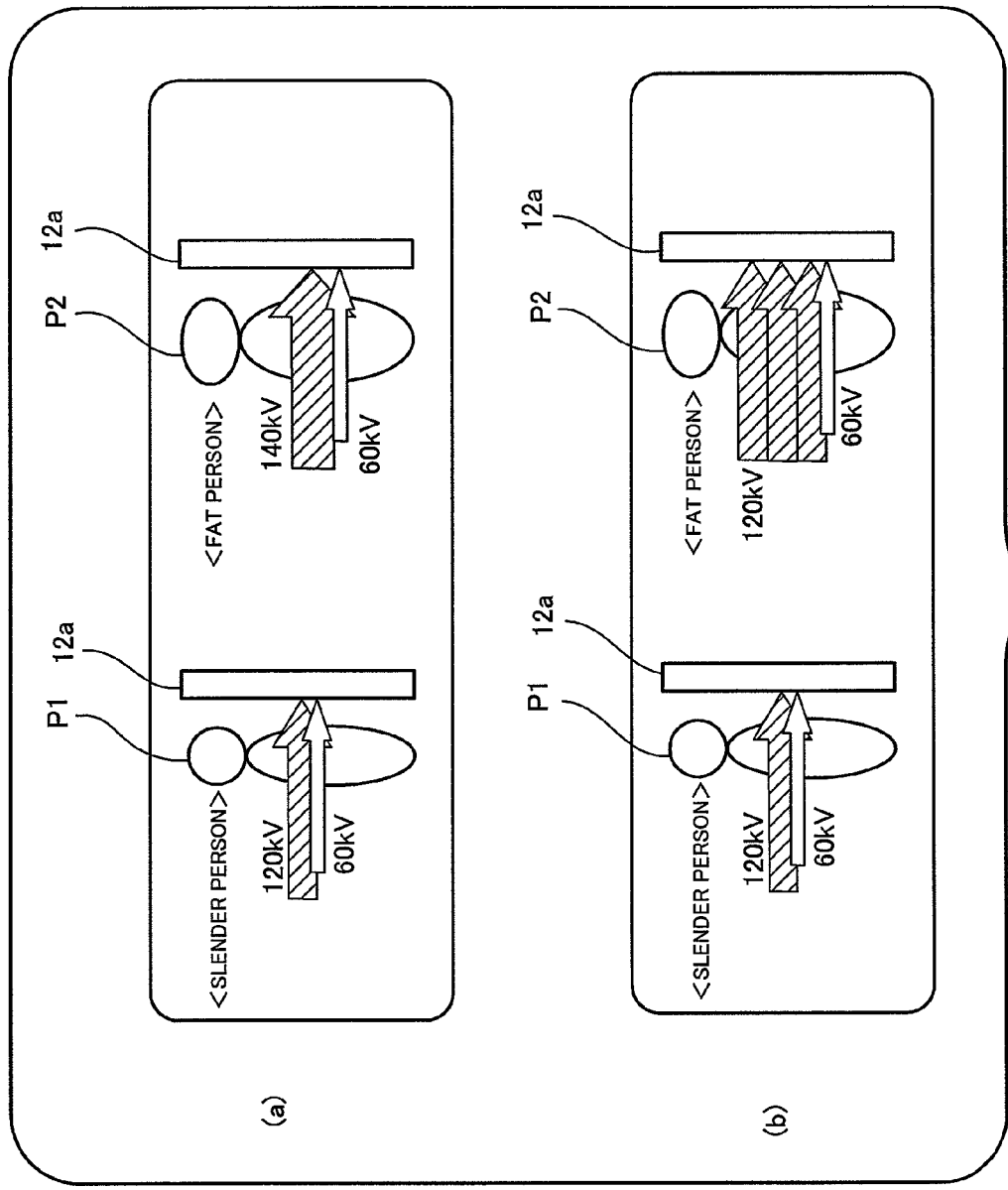
Figure 9:
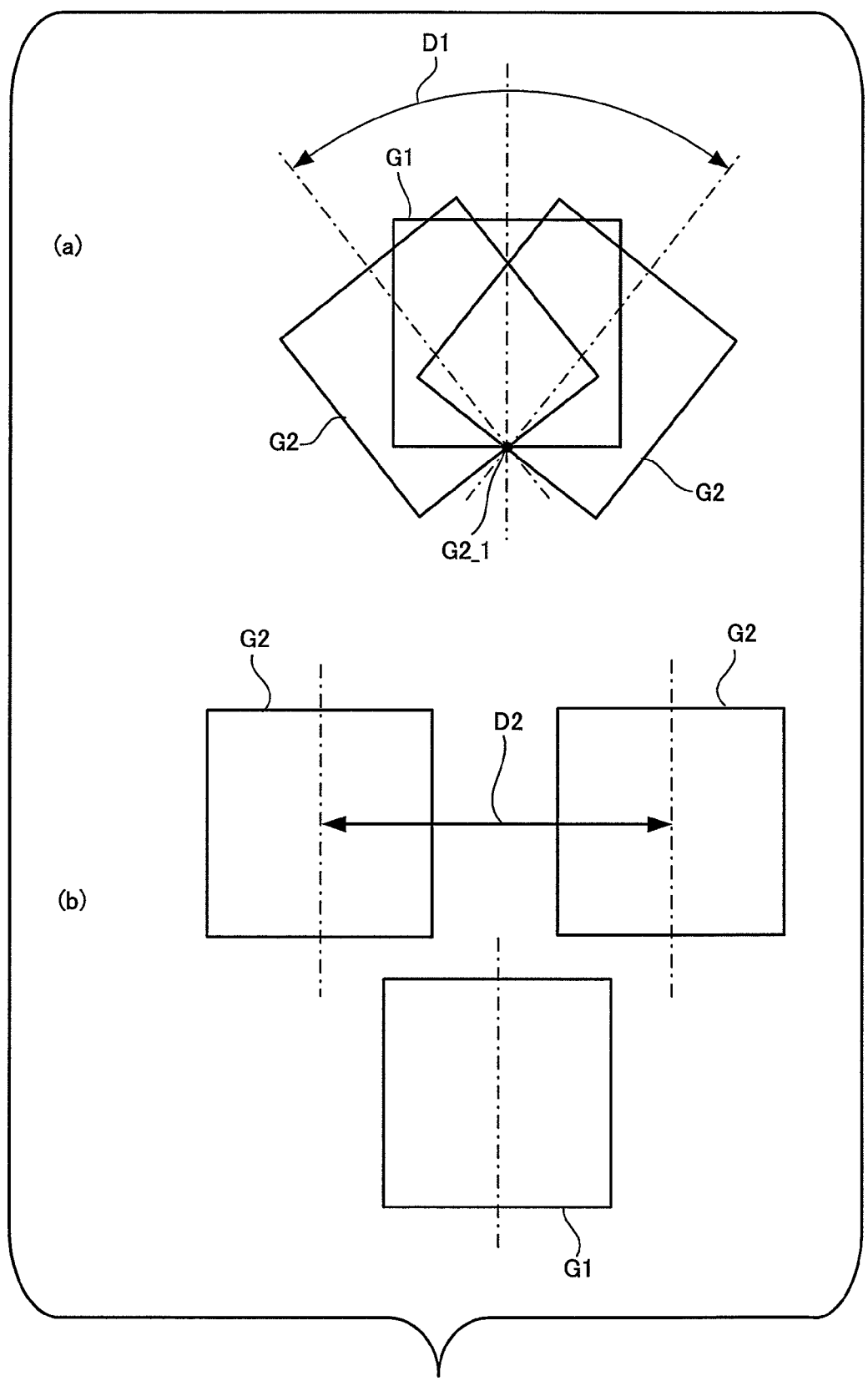
Figure 10:
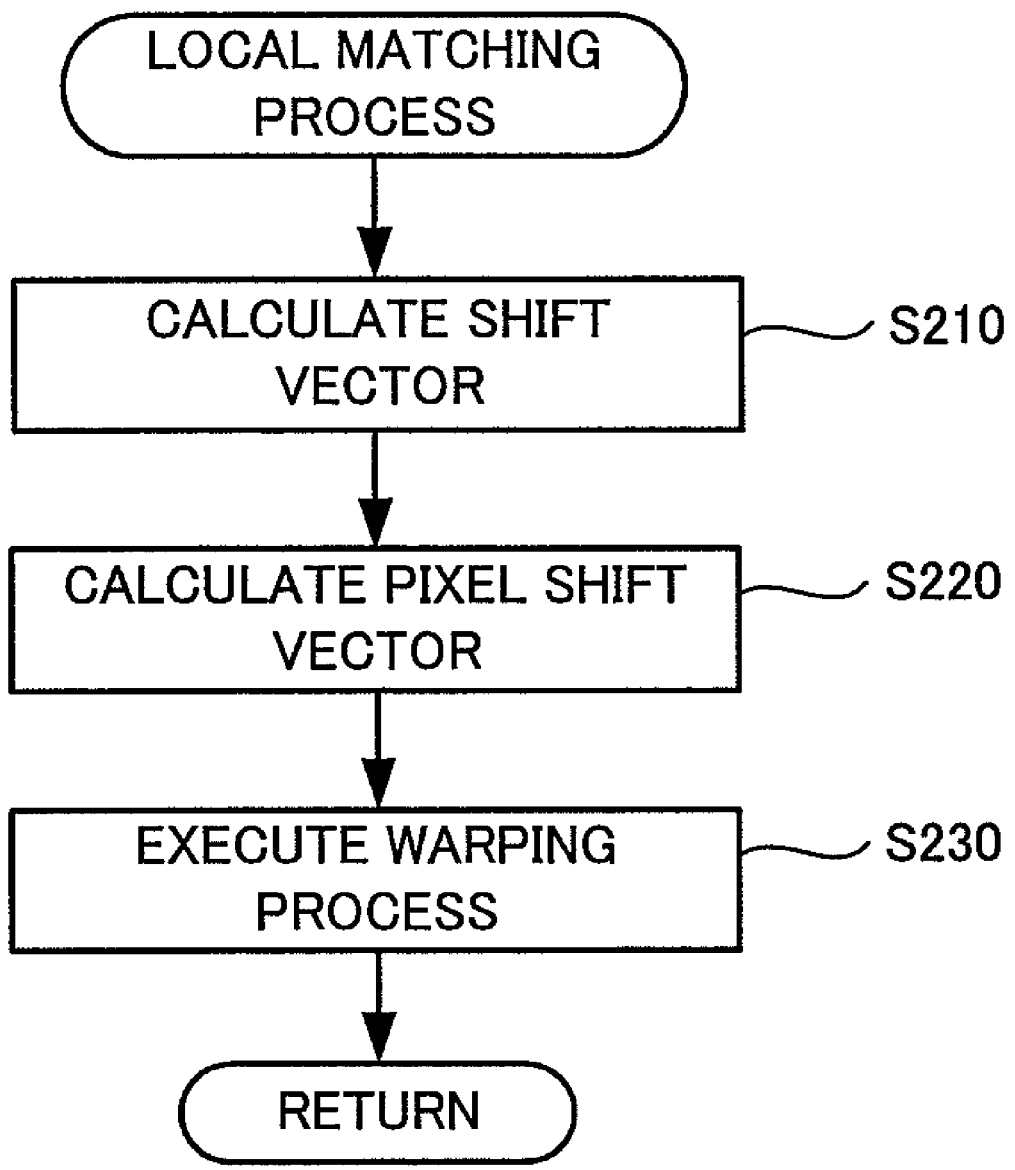
Figure 11:
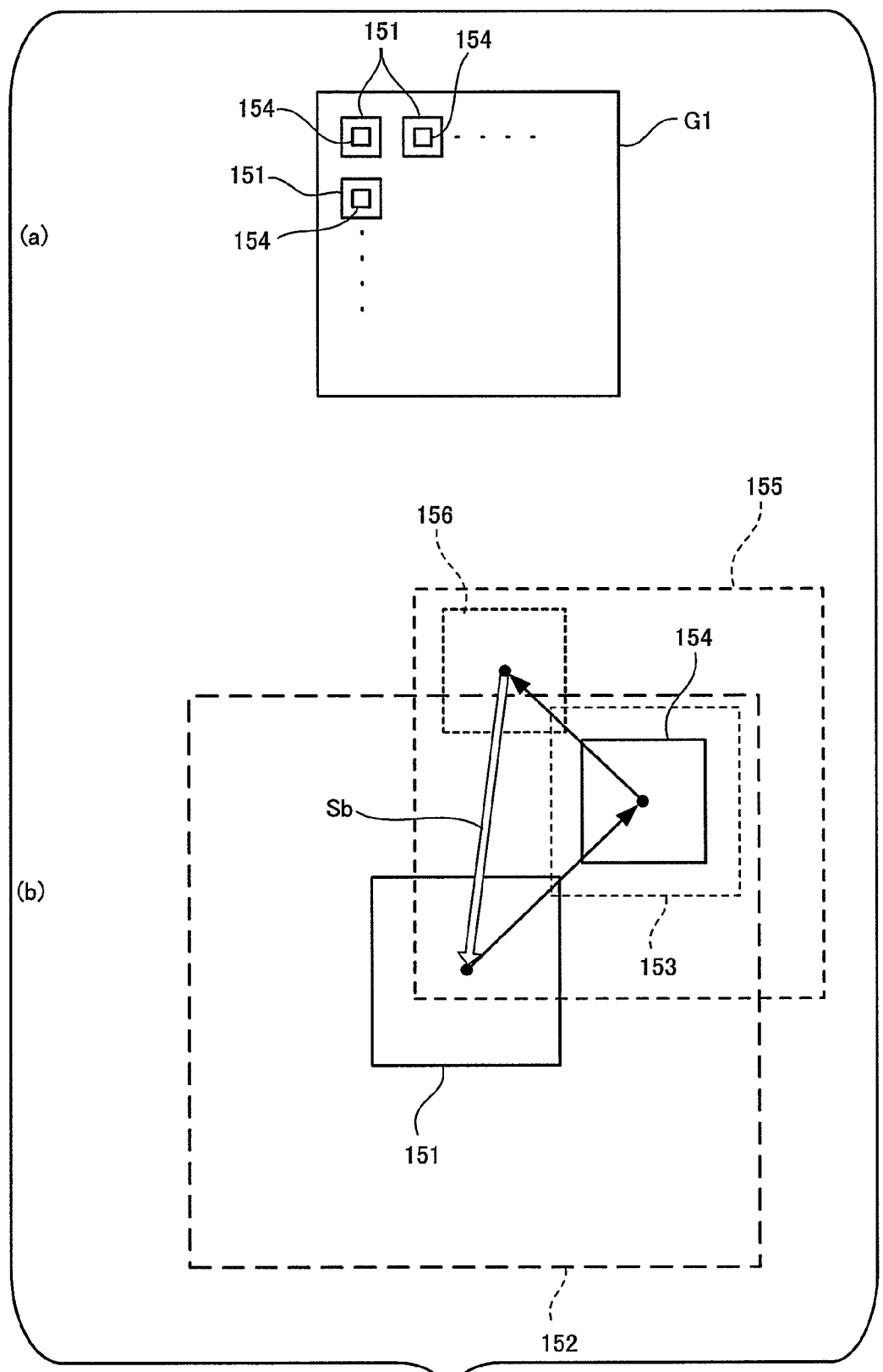
Figure 12:
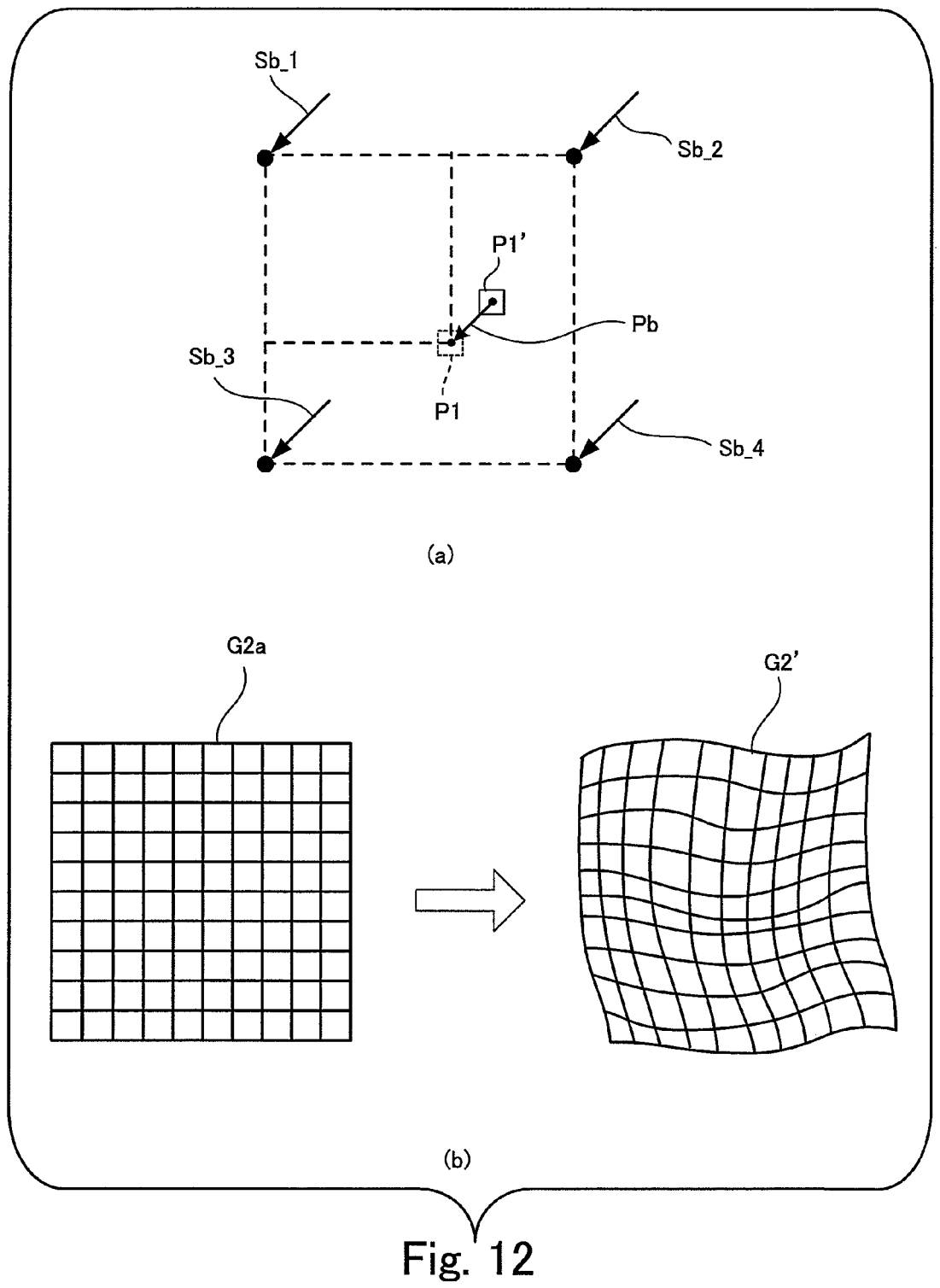
Figure 14:
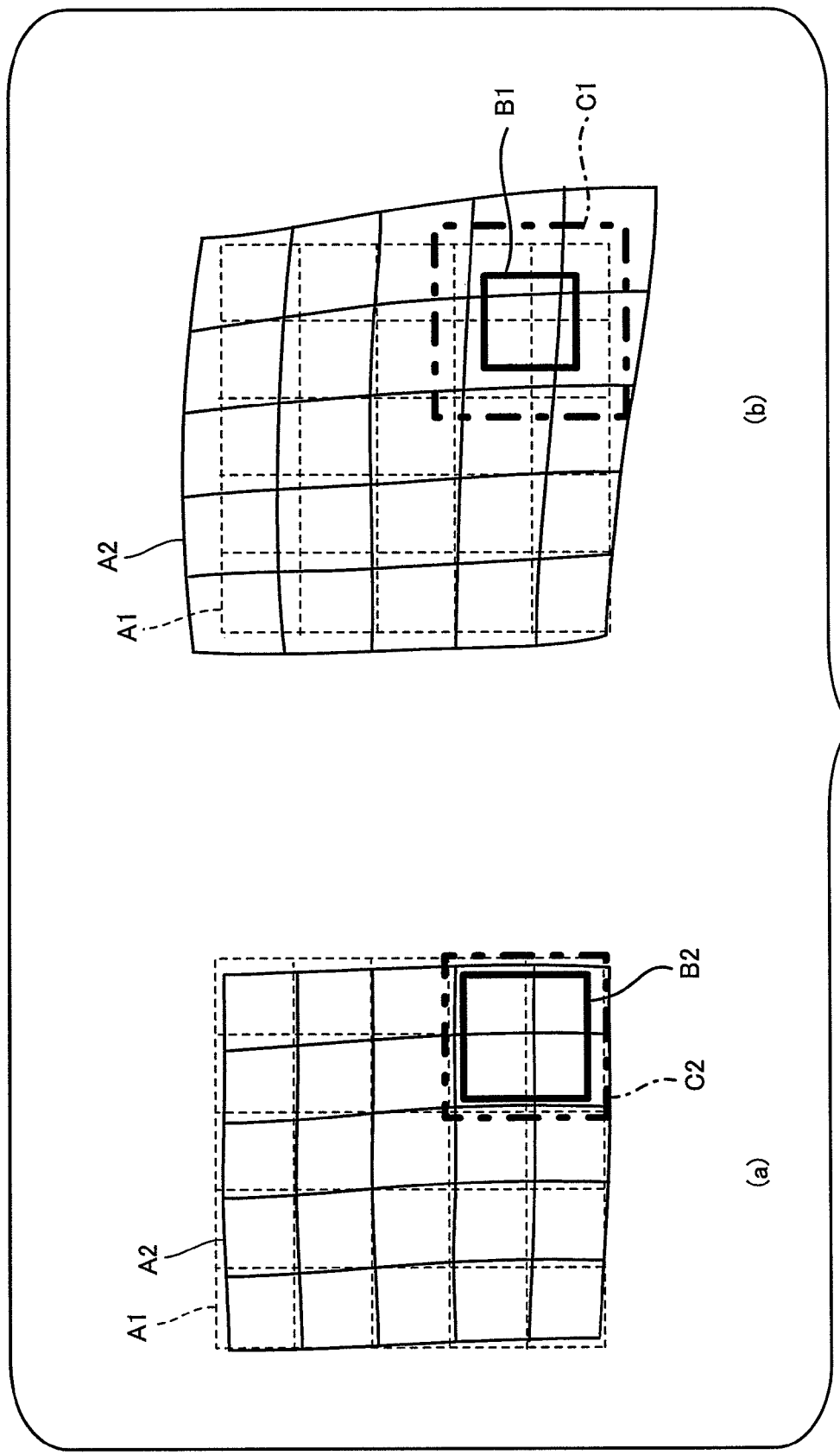
Figure 15:
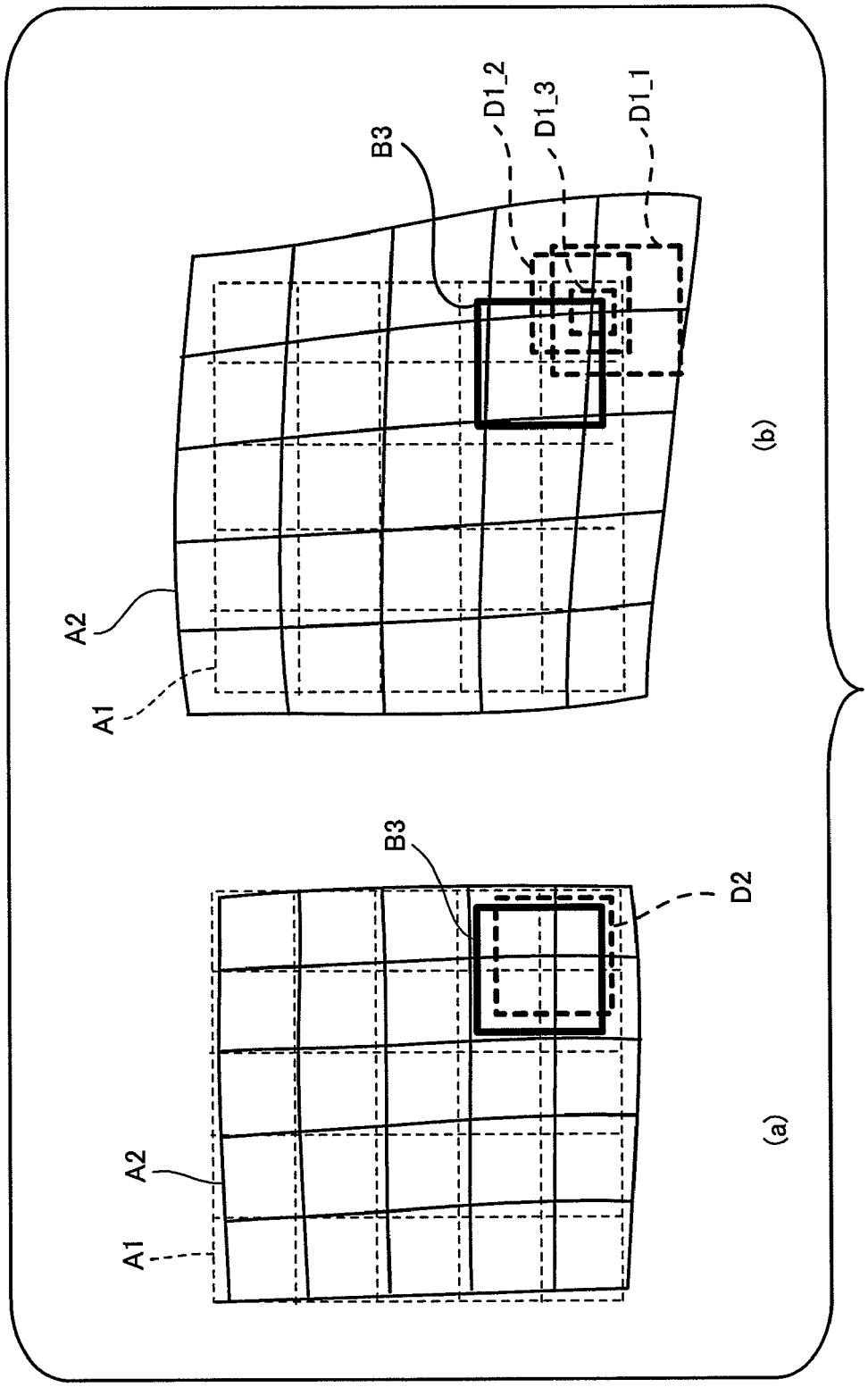
Figure 16:
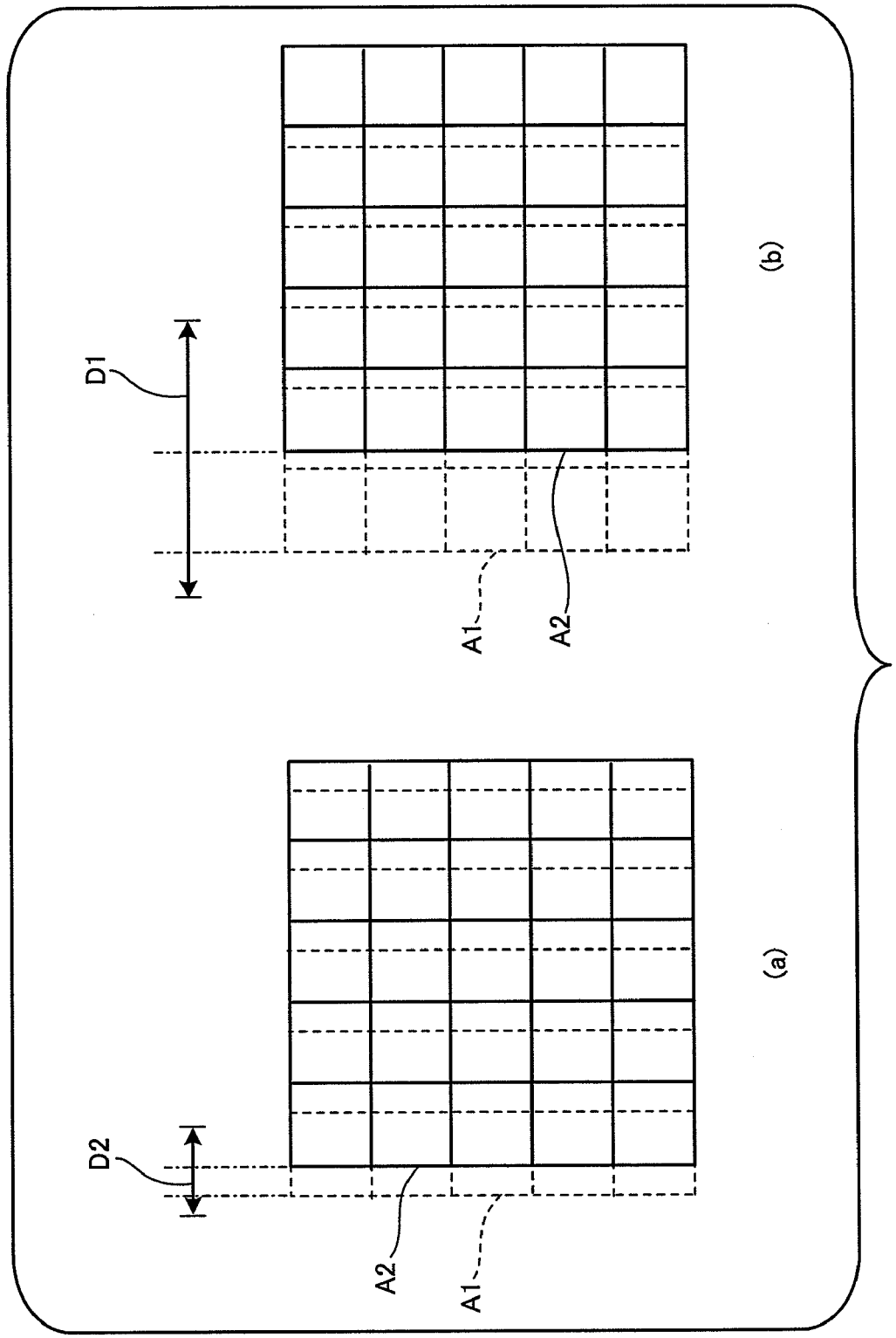

Part (a) and part (b) of FIG. 8 each show the relationship between physical constitutions of examination objects and imaging intervals;

Part (a) and part (b) of FIG. 9 are schematic views respectively showing rotational and parallel movement of the second medical image (G2) with respect to the first medical image (G1);

FIG. 10 is a detailed flowchart showing a local matching process (step 200) shown in FIG. 7;

Part (a) and part (b) of FIG. 11 schematically show a process of calculation of a shift vector;

Part (a) and part (b) of FIG. 12 schematically show a process of calculation of shift vectors of pixels and a warping process in accordance with the shift vectors of pixels;

FIG. 13 is a view showing a correlation table in which imaging intervals and values of respective parameters are correlated to one another;

Part (a) and part (b) of FIG. 14 show an example in which a matching process for two images is performed by use of a predetermined portion having an appropriate area size corresponding to an imaging time difference;

Part (a) and part (b) of FIG. 15 show an example in which the matching process for two images is performed through an appropriate number of searches for a matching portion corresponding to the imaging time difference; and FIG. 16 shows one example in which the matching process for two images is performed through movement within an appropriate permissible range corresponding to the imaging time difference.

DETAILED DESCRIPTION OF THE INVENTION

An embodiment of the present invention will be described with reference to the accompanying drawings.

Figure 1:
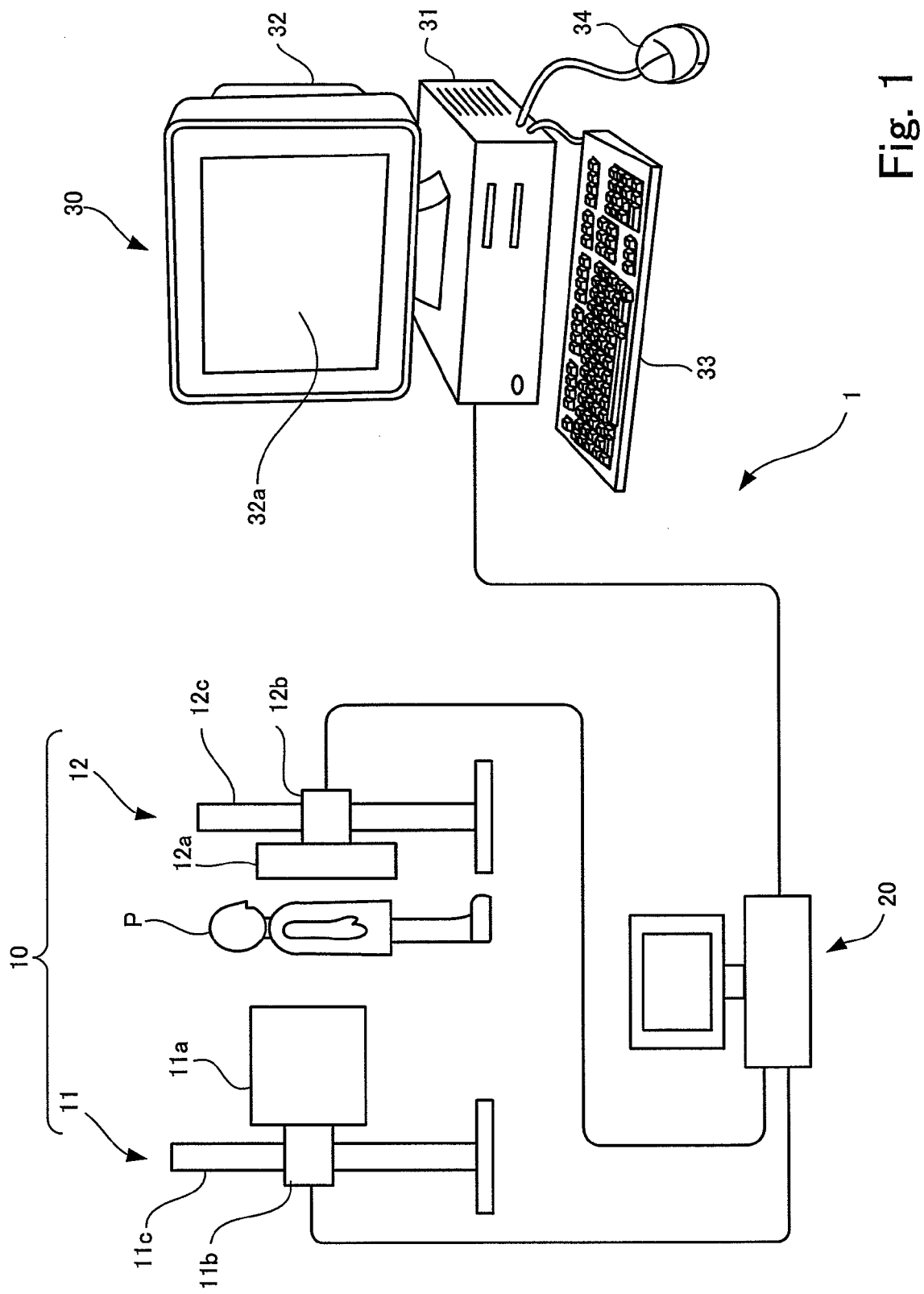
FIG. 1 is a schematic diagram of an overall configuration of a medical image acquisition system to which one embodiment of the present invention is applied.

FIG. 1 is a schematic diagram of an overall configuration of a medical image acquisition system 1 to which one embodiment of the present invention is applied.

The medical image acquisition system 1 shown in FIG. 1 is configured to include an image generation system 10 that generates medical images by imaging a body of an examination object P, a system controller device 20 that controls the image generation system 10, and a medical image display device 30 that displays medical images. The system controller device 20 and the medical image display device 30 are connected together via network lines.

The image generation system 10 is configured to include an x-ray radiator device 11 that emits or radiates x-rays, a detector device 12 that detects a respective x-ray penetrated through the body of the examination object P, thereby acquiring medical images.

The x-ray radiator device 11 includes a stowage section 11a that contains, for example, x-ray tubes that emit x-rays, a moving section 11b that vertically moves the stowage section 11a, and a support section 11c that supports the stowage section 11a and the moving section 11b.

The detector device 12 is a device of a standing type on which a flat panel detector (FPD) 12a is mounted. The detector device 12 includes, in addition to the FPD 12a, a moving section 12b that vertically moves the FPD 12a, and a support section 12c that supports the FPD 12a and the moving section 12b.

In the image generation system 10, the examination object P stands between the x-ray radiator device 11 and the FPD 12a, facing the FPD 12a.

A user operates the system controller device 20 to input the positions of the stowage section 11a and the FPD 12a that corresponds to an imaging portion of the examination object P. In response to the input operation, the system controller device 20 supplies instruction signals to the moving section 11b of the x-ray radiator device 11 and the moving section 12b of the detector device 12, respectively, to dispose the stowage section 11a and the FPD 12a in the positions input by the user. As a consequence, the stowage section 11a and the FPD 12a are disposed in the positions input by the user in correspondence to the imaging portions of the examination object P.

Subsequently, any one of two imaging modes, namely a single-shot imaging mode and a continuous-shot imaging mode for an ES process described further below, the level of energy of the x-ray to be radiated in the imaging event, and the like are input by the user as imaging conditions into the system controller device 20. Further, when the continuous-shot imaging mode is input and specified as the imaging mode, an imaging interval described further below, the energy level of the x-ray in the respective imaging event, and the like are input into the system controller device 20 to be specified as imaging conditions for continuous-shot imaging process. The input imaging conditions are set by the system controller device 20 in, for example, a control circuit for an x-ray tube that emits x-rays in the stowage section 11a of the x-ray radiator device 11 and an imaging control circuit in the FPD 12a of the detector device 12.

Then, when the user provides an instruction for initiation of the imaging process by operating the system controller device 20, the system controller device 20 supplies respective predetermined trigger signals to the x-ray radiator device 11 and the detector device 12 in synchronization with each other. In the stowage section 11a of the x-ray radiator device 11, when the trigger signal is received, the x-ray tube emits the x-ray having the energy level specified as the imaging conditions. In addition, in the FPD 12a of the detector device 12, when the trigger signal is received, an x-ray is detected. Thereby, an x-ray penetrated through the body of the examination object P is detected by FPD 12a, and the imaging process is performed therewith. As a consequence, digital medical images indicative of the interior of the examination object P can be acquired in the image generation system 10.

Further, when the continuous-shot imaging mode is specified by the user, two imaging processes at the imaging interval being interposed therebetween, which interval is specified for the imaging conditions, are performed in response to one shot of the trigger signal supplied from the system controller device 20. The imaging processes are performed with the respective x-rays having the energy levels (simply "energies", hereinbelow) specified for the imaging conditions. Through the continuous-shot imaging process thus performed, two medical images can thus be obtained by use of two types of x-rays having energies different from each other.

The medical images acquired through the imaging process are supplied to the system controller device 20 from the image generation system 10, and are displayed on a predetermined monitor in the system controller device 20. Further, information, such as an ID (identification) number for identifying the examination object P, an imaging date and year, and an imaging time, are input as management information into the system controller device 20 through the operation of the user. Then, in the system controller device 20, the management information and the imaging conditions used for the imaging process that acquires the medical images are appended to the medical images supplied from the image generation system 10. Further, two images thus acquired through the continuous-shot imaging process, respectively, are supplied with the affixed management information and imaging conditions, and are correlated to one another. Then, the system controller device 20 transmits the medical images with the affixed management information and imaging conditions to the medical image display device 30 via the network lines.

The medical image display device 30 is exteriorly configured to include a main device 31, an image display device 32, a keyboard 33, and a mouse 34. The image display device 32 displays an image on a display screen 32a in response to an instruction received from the main device 31. The keyboard 33 inputs various types of information corresponding to key operations. The mouse 34 is used to point and specify an arbitrary position on the display screen 32a, to thereby input an instruction corresponding to, for example, an icon, displayed on the position.

In the medical image display device 30, when the user inputs, for example, an ID number of an examination object by operating the medical image display device 30, a medical image or the like corresponding to the input ID number or the like is displayed on the image display device 32. By verifying the medical image or the like displayed on the display screen 32a of the medical image display device 30, the user is enabled to diagnose the disease condition of the examination object without exterior damage being caused on the examination object.

The medical image acquisition system 1 shown in FIG. 1 is basically configured as described above.

A feature of the medical image acquisition system 1 lies in the contents of a process that is executed in the medical image display device 30. The medical image display device 30 will be described in detail below.

Figure 2:
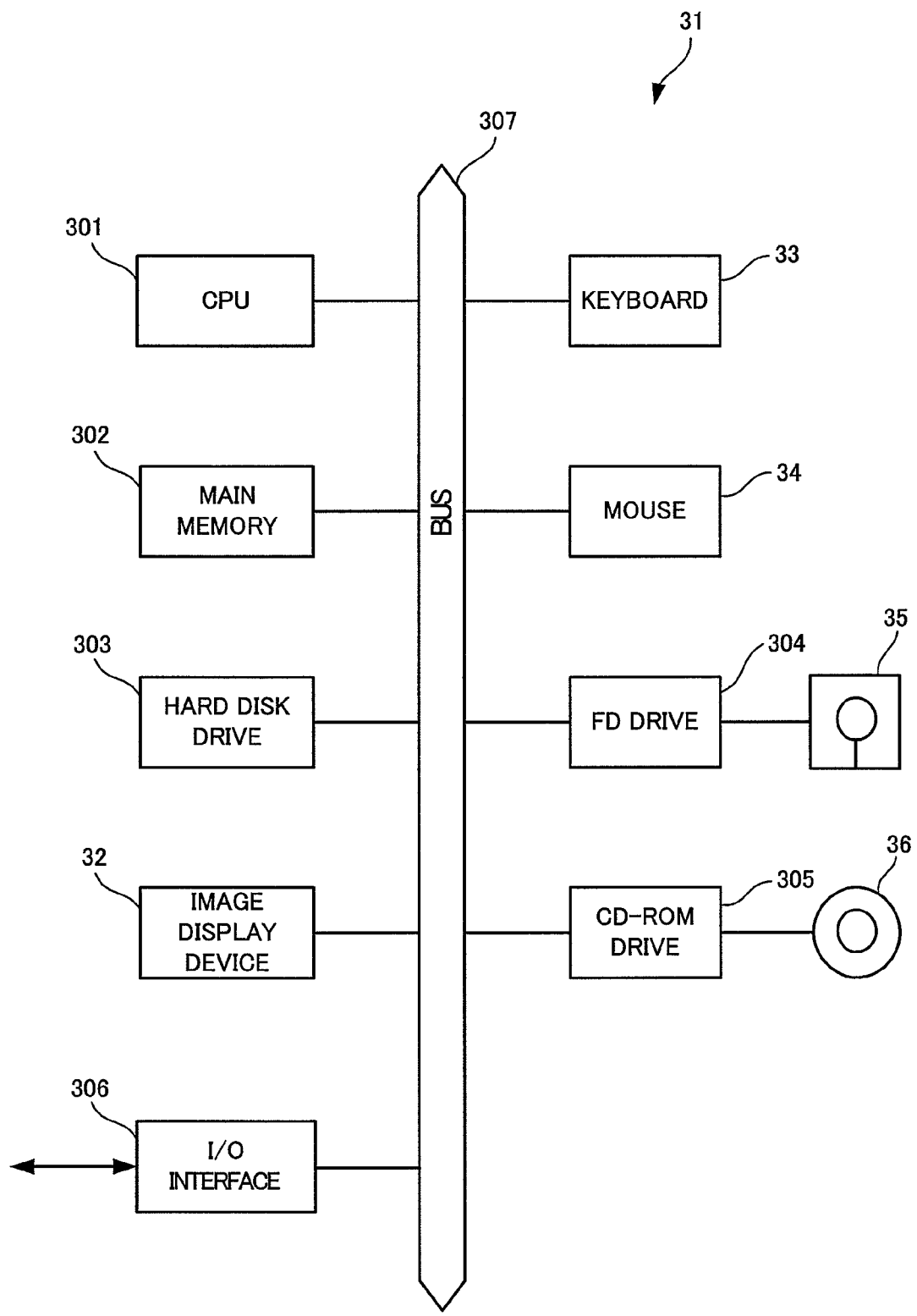
FIG. 2 is a hardware configuration diagram of a diagnostic apparatus.

FIG. 2 is a hardware configuration diagram of the medical image display device 30.

With reference to FIG. 2, the main device 31 of the medical image display device 30 includes therein a CPU 301, a main memory 302, a hard disk drive 303, an FD drive 304, a CD-ROM drive 305, and an I/O interface 306. The CPU 301 executes various types of programs. In the main memory 302, programs stored in the hard disk drive 303 are each read out and expanded to be executed in the CPU 301. The hard disk drive 303 stores thereon various types of programs and data, for example. The FD drive 304 allows an FD 35 to be mounted therein, and accesses the FD 35. The CD-ROM drive 305 accesses a CD-ROM 36. The I/O interface 306 is used for communication of various types of information, such as medical images, with the system controller device 20. The various components described hereinabove and the image display device 32, keyboard 33, and mouse 34 shown also in FIG. 1 are connected to each other via a bus 307.

The medical image display device 30 has a function operating as an ES processor device that executes the so-called energy subtraction (ES) process. In the ES process, of two medical images acquired in the continuous-shot imaging process with the use of x-rays having energy levels different from each other, pixel values in one of the medical images are subtracted from pixel values in the other of the medical images by allocating predetermined weights thereto. Thereby, in a body structure of an examination object imaged on the former medical image, an image region in a site having a specific absorption property against the x-ray is erased.

In order that the ES process is performed with high accuracy, it is preferable that two medical images match each other. In the image generation system 10 shown in FIG. 1, two medical images are different in imaging time from each other, so that, depending on the case, two medical images do not always match each other because of, for example, the posture or breathing of an examination object. When, in a case where two images do not match each other, the ES process is forcibly applied thereon, artifacts which are inherently unpresent appear in mismatched regions of the two images, thereby hindering the examination.

As such, the medical image display device 30 has also a function operable as an image processing device, in which, of two medical images to be subjected to the ES process, one of the images is warped and thereby matched with the other image.

Figure 3:
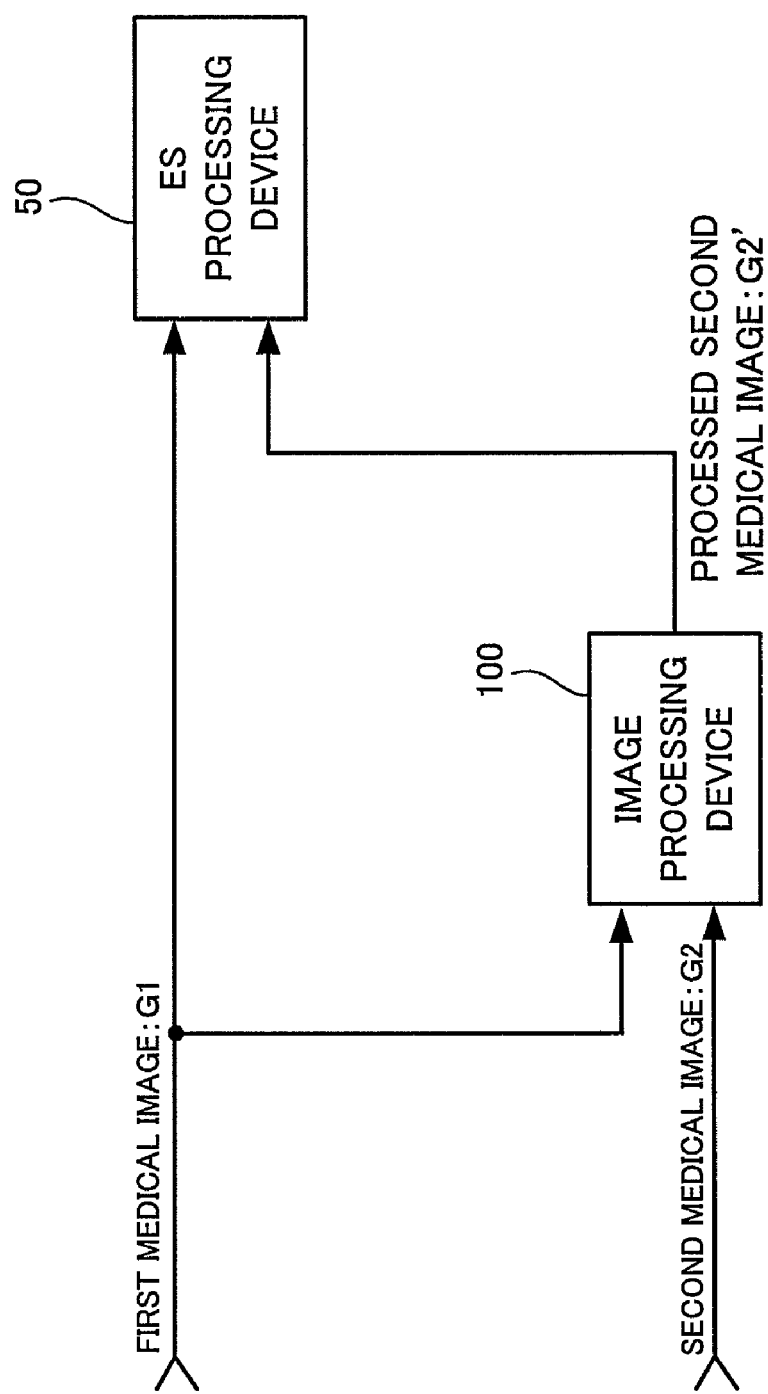
FIG. 3 is a block diagram showing the relationship between an ES processing device that performs an ES process and an image processing device that performs an image process for performing the ES process.

FIG. 3 is a block diagram showing the relationship between an ES processing device 50 that performs an ES process and an image processing device 100 that performs an image process for performing the ES process.

The ES process is performed in accordance with first and second medical images G1 and G2 acquired through the continuous-shot imaging process performed in the image generation system 10 shown in FIG. 1. The first medical image G1 is input into the ES processing device 50. On the other hand, the second medical image G2 in the image processing device 100, after subjected to the image process that causes the second medical image G2 to match the first medical image G1 is performed, and a processed second medical image G2' is input into the ES processing device 50. The image process to be executed in the image processing device 100 will be described later in detail, and the ES process will first be described below.

Figure 4:
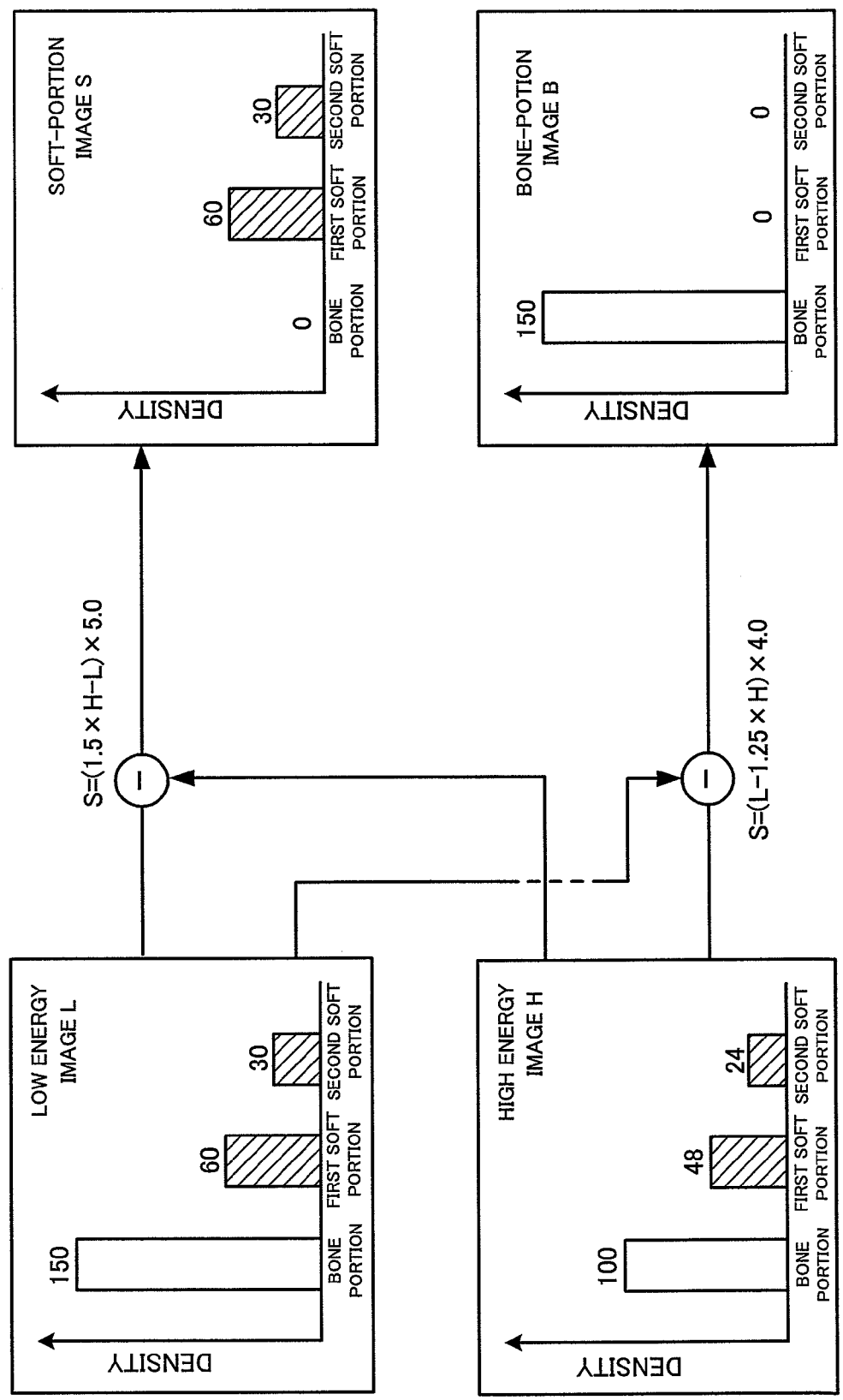
FIG. 4 is an explanatory view of the ES process.

FIG. 4 is an explanatory view of the ES process.

As described above, the two medical images to be used in the ES process are photographic images acquirable through the continuous-shot imaging process with the use of two x-rays having energies different from each other. FIG. 4 is a schematic view showing a principle of the ES process. According to the principle, a low energy image L acquired through an imaging process with a relatively low energy x-ray and a high energy image H acquired through an imaging process with a relatively high energy are used, and an image region of a desired site is erased from the low energy image L.

In the medical image obtained in the image generation system 10 (see FIG. 1) in which the x-ray penetrated through the body of an examination object is detected, and the body image of the examination object is acquired, a region where the amount of x-ray penetration is large is imaged with high density. In contrast, a region where the amount of x-ray penetration is small is imaged with low density. In such a medical image, since the x-ray penetration is hindered by the bone, the amount of x-ray penetration is small for bone portion in the body of the examination object, so that the bone portion appears with low density. On the other hand, in soft portion, such as muscle tissue, the amount of x-ray penetration is large relative to that in the bone portion, so that the soft portion appears with high density. Further, in regard to the soft portions, the amount of x-ray penetration is different depending upon the type of tissue or the like, so that the respective soft portions appear with a density corresponding to the type of tissue or the like.

Further, the penetration power of the x-ray is higher as the energy is higher, so that the effect of x-ray penetration hindrance due to bone is lower as the energy of the x-ray used in the imaging process is higher. As a consequence, the high energy image H and the low energy image L are different from each other in the density rate (degree of contrast) between the bone portion and the soft portion. In the ES process, bone portion erasure, soft portion erasure, and the like are performed by utilizing the difference in contrast between the two types of images.

As described above, in the ES process in the example shown in FIG. 4, an image region of a desired site is erased from the low energy image L. FIG. 4 shows two examples of image creation. In one example, a bone-portion image region is erased from the low energy image L to thereby create a soft-portion image S in which only soft portions appear; and in the other example, the soft-portion image region is erased from the low energy image L to thereby create a bone-portion image B in which only the bone portion appears.

More specifically, in the example of creating the soft-portion image S, the densities of the bone-portion image regions of the two medical images are first matched with each other, and the difference therebetween is calculated. As a consequence, an image in which the density of the bone-portion image region is "0", that is, an image formed by erasing the bone-portion image region, is created. In this case, since the degrees of constant in the bone-portion and soft-portion image regions of the respective high and low energy images H and L are different from each other, the bone-portion image region remains even after the bone-portion image region has been erased. Then, a resultant, calculated value of the difference in the density of the soft-portion image region is multiplied by a coefficient that is provided to match the value of the difference with the density in the low energy image L. Thereby, the bone-portion image region is erased from the low energy image L, and the soft-portion image S in which only the soft-portion image region appears can be obtained.

In the example of creating the bone-portion image B, the densities of the soft-portion image regions of the two medical images are first matched with each other, and the difference therebetween is calculated, whereby an image in which the density of the soft-portion image region is "0" that is, an image formed by erasing the soft-portion image region, is created. Then, a value of the difference in the density of the bone-portion image region is matched with the density of the bone-portion image region in the low energy image L through the multiplication of a coefficient. Thereby, the soft-portion image region is erased from the low energy image L, and the bone-portion image B in which only the bone-portion image region appears can be obtained.

As described above, in the ES process, erasure of an image region in a desired site is performed through the calculation of the difference between two medical images. Hence, when, in the event of erasing a bone-portion image region, a mismatch is present between the positions of bone-portion image regions of two medical images, the density of the mismatch region cannot be "0", there appears inherently-unpresent ghost image regions (artifacts). As such, in order that the ES process is executed with high accuracy, two medical images have to match each other with high accuracy. As described above, in the medical image display device 30 of the medical image acquisition system 1 shown in FIG. 1, matching between two medical images to be subjected to the ES process is accomplished by the image processing device 100 shown in FIG. 4. The image processing device 100 will now be described in more detail below.

The image processing device 100 is built in the medical image display device 30 shown in FIG. 1 when the medical image display device 30 operates in accordance with an image processing program 200 (FIG. 5) corresponding to the image processing device 100. The image processing program 200 is stored in the CD-ROM 36 shown in FIG. 2, and is supplied to the medical image display device 30 via the CD-ROM 36.

In the above, while the CD-ROM 36 is described as an example of a storage medium storing thereon the image processing program, the storage medium storing therein the image processing program is not limited to the CD-ROM, but may be any one of other storage media, such as an optical disk, an MO, an FD, and a magnetic tape. Further, the image processing program 200 may be of the type that is directly supplied to the medical image display device 30 via the I/O interface 306 without being supplied via the storage medium.

Figure 5:
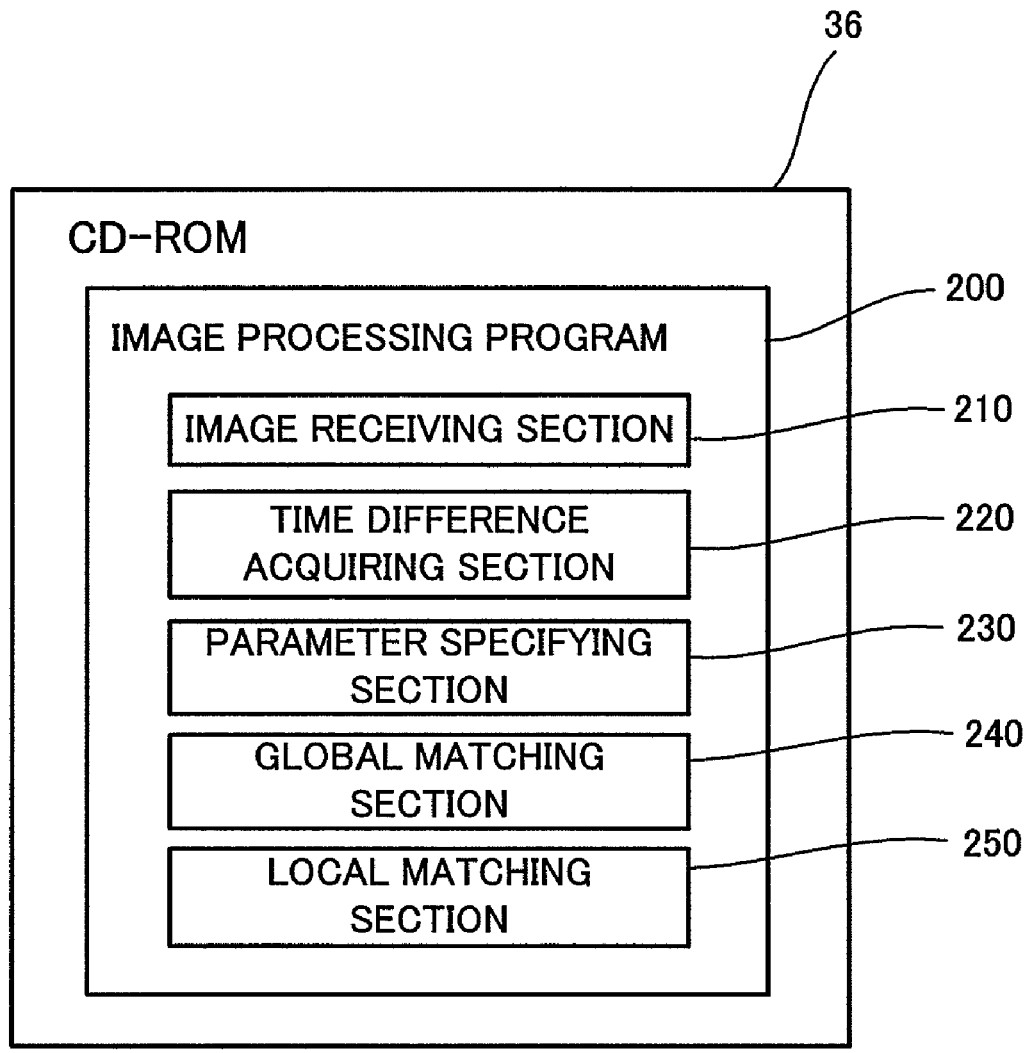
FIG. 5 is a conceptual diagram showing a CD-ROM storing an image processing program.

FIG. 5 is a conceptual view showing the CD-ROM 36 storing thereon the image processing program 200.

With reference to FIG. 5, the image processing program 200, which is stored in CD-ROM 36, is configured to include an image receiving section 210, a time difference recognition section 220, a parameter determination section 230, a global matching section 240, and a local matching section 250.

The individual sections of image processing program 200 will be described in detail below together with operations of the individual sections of the image processing device 100.

Figure 6:
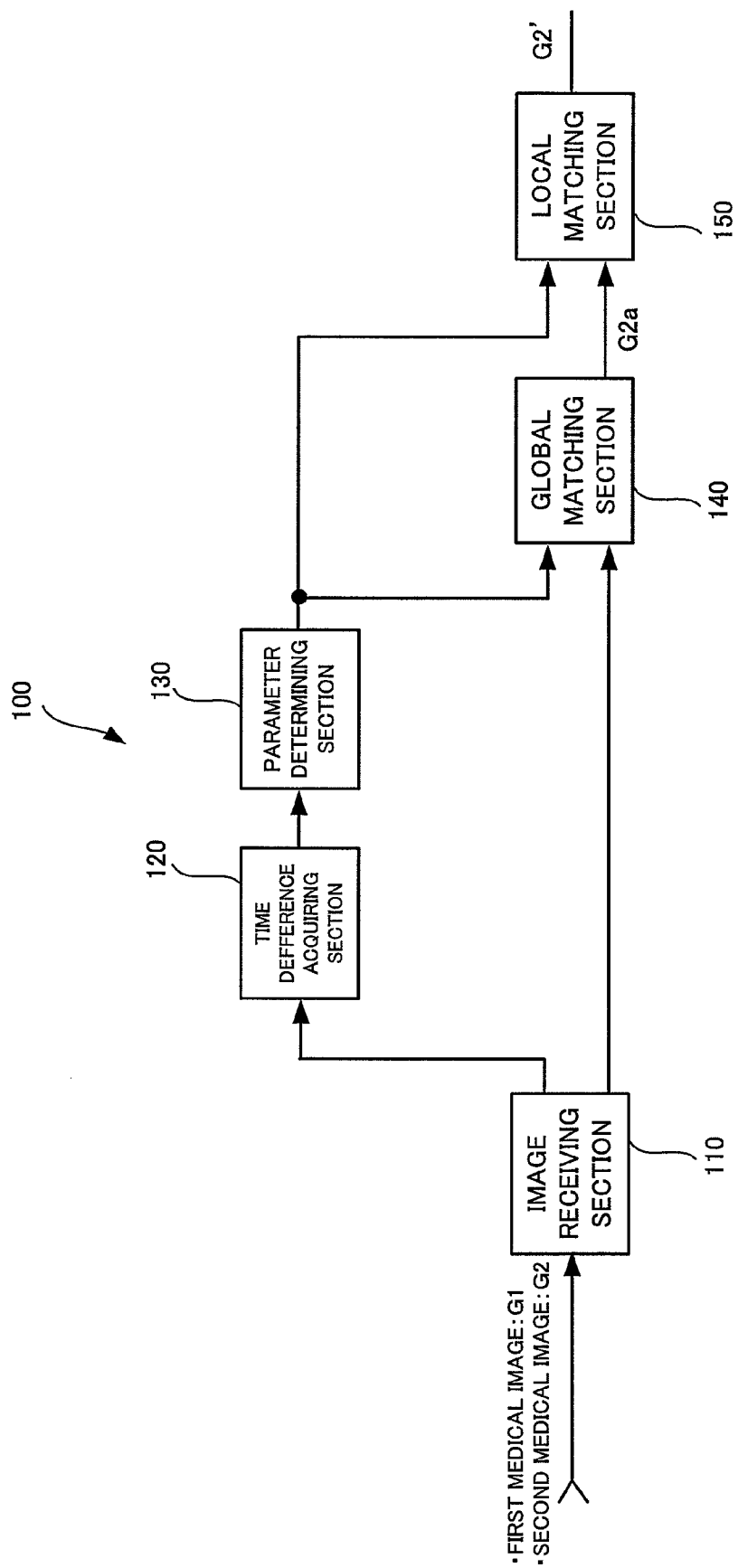
FIG. 6 is a functional block diagram of an image processing device.

FIG. 6 is a functional block diagram of the image processing device 100.

The image processing device 100 includes an image receiving section 110, an time difference recognition section 120, a parameter determination section 130, a global matching section 140, and a local matching section 150.

The image receiving section 110, the time difference recognition section 120, and the parameter determination section 130, which are shown in FIG. 6, respectively, corresponds to one example of the image receiving section, the time difference recognition section, and the parameter determination section according to the present invention. Further, either the global matching section 140 or the local matching section 150 corresponds to one example of the processing section according to the present invention.

Further, the image receiving section 110, the time difference recognition section 120, the parameter determination section 130, the global matching section 140, and the local matching section 150, which constitute the image processing device 100 shown in FIG. 6, respectively, correspond to the image receiving section 210, the time difference recognition section 220, the parameter determination section 230, the global matching section 240, and the local matching section 250, which constitute the image processing program 200 shown in FIG. 5.

Further, the respective sections shown in FIG. 6 are configured of combinations of hardware products of a computer and products, such as an operating system (OS) and application programs, which are executed in the computer. However, the respective sections of the image processing program 200 shown in FIG. 5 are different from those of FIG. 6 in that they are configured only of the application programs.

FIG. 7 is a flowchart showing the flow of a series of processes that, in the image processing device 100 shown in FIG. 5, receives two medical images G1 and G2, and that matches the second medical image G2 with the first medical image G1.

The operations of the respective sections of the image processing device 100 shown in FIG. 6 will be described in accordance with the flowchart of FIG. 7, to thereby together describe the operations of the respective sections of the image processing program 200 shown in FIG. 5. Description below refers to the respective sections of FIG. 6 without reference to the drawing figure numbers relevant thereto.

The image process shown in the flowchart of FIG. 7 starts as a preparatory process of the ES process before execution of the ES process in response to predetermined operations of the user. In this case, by carrying out the predetermined operations with the medical image display device 30 of FIG. 1, the user specifies the two medical images G1 and G2 that are to be subjected to or to undergo the ES process, and enters an instruction for the execution of the ES process.

To begin with, upon starting of the process, the image receiving section 110 receives the two medical images G1 and G2, which are specified by the user, by reading out from a predetermined memory (at step S101).

The two, first and second medical images G1 and G2 are photographic images acquired through the continuous-shot imaging. Here, it is assumed that the first medical image G1 is a photographic image acquired through an initial or first shot imaging process, and the second medical image G2 is a photographic image in the subsequent or second shot imaging process. In the image process of FIG. 7, the second medical image G2 is warped so as to match with the first medical image G1.

The image receiving section 210 passes the received two medical images G1 and G2 to the time difference recognition section 120 and the global matching section 140.

First, the time difference recognition section 120 receives an imaging interval (at step S102) between the operations of continuous-shot imaging performed to acquire the two medical images G1 and G2. In this step, the imaging interval is received from imaging conditions respectively appended to the passed two medical images G1 and G2, as described in the earlier portion above.

As described in the earlier portion above, the imaging interval is one of those input (specified) by the user, together with the amounts of x-ray energy and the like for the use in the respective imaging processes as the imaging conditions for the continuous-shot imaging. The operation of input (specification) by the user will be further described below.

In the present embodiment, two or more imaging intervals, such as "0.2 sec.", "0.5 sec.", and "0.7 sec." are preliminarily provided as imaging intervals with which the continuous-shot imaging process can be executed. When a continuous-shot imaging mode is input and specified as an imaging mode by a user, the two or more imaging intervals are displayed on the monitor of the system controller device 20. Then, a desired one of the imaging intervals is selected and input by the user through predetermined operations.

The imaging interval selection by the user is carried out in accordance with, for example, the physical constitution of the examination object, as described further below.

Parts (a) and (b) of FIG. 8 show the relationship between physical constitutions of examination objects and imaging intervals.

FIG. 8 further shows how the continuous-shot imaging of a slender examination object P1 and the continuous-shot imaging process of a fat examination object P2 are performed. In the examples of FIG. 8, in the case of the slender examination object P1, imaging process that acquires a high energy image (H) such as described above is executed by use of an x-ray having an energy of "120 kV". In addition, imaging process that acquires a low energy image (L) such as described above is executed by use of an x-ray having an energy of "60 kV".

On the other hand, for the fat examination object P2, the x-ray is less likely to penetrate through the body of the examination object, and hence the amount of the x-ray reaching the FPD 12a is prone to shortage. As a consequence, the degree of contrast between the bone-portion and soft-portion image regions of the high energy image and the degree of contrast between bone-portion and soft-portion image regions of the low energy image are not sufficiently different from each other. This hampers effectiveness of the ES process. In order that the ES process is effectively executed, the degree of the contrast between the two images needs to be higher. For this reason, shortage in the amount of the x-ray reaching the FPD 12a needs to be compensated for in the event of imaging process that acquires the high energy image to acquire a preferable high energy image having a degree of contrast different as much as possible from the low energy image.

In the present embodiment, for the fat examination object P2, imaging using a method described hereinbelow is executable to image a preferable high energy image such as described above. In the preferable method, imaging process that acquires the high energy image is executed by use of an x-ray having high energy sufficient to penetrate through the fat examination object P2. According to the method, since the penetration power of the x-ray for the use of imaging is high, the x-ray is capable of reaching the FPD 12a, consequently making it possible to acquire a preferable high energy image different in contrast from the low energy image. In Part (a) of FIG. 8, there is shown one example in which the continuous-shot imaging employing the method described above is executed to acquire images of the fat examination object P2. In the example shown in Part (a) of FIG. 8, for the fat examination object P2, imaging process that acquires the high energy image is executed by use of an x-ray having an energy of "140 kV", and imaging process that acquires the low energy image is executed by use of an x-ray having an energy of "60 kV". According to the method described above, the respective x-ray having a high energy sufficient to penetrate the fat examination object P2 is used in the imaging process that acquires the high energy image. Hence, the difference in the energies (energy levels) between the x-rays in the operations of imaging process that acquires the respective high and low energy images is increased. Nevertheless, however, when two types of x-rays with a large difference in the energies are continuously irradiated for a short time period for the continuous-shot imaging, the respective x-rays being irradiated become unstable. Further, such the continuous irradiation for the short time period results in imposing a high load on the x-ray radiator device 11. Hence, as the imaging conditions for the continuous-shot imaging for the fat examination object P2, when the user inputs the levels of x-ray energies such that the difference in the first and second shots increases, the input level a slightly long imaging interval will be input.

Further, as an imaging method that acquires the preferable high energy image of the fat examination object P2, an imaging process employing an imaging method, as described below, which is different from the above-described imaging method, can be contemplated. In this method, for the slender examination object P1, an x-ray having the energy identical to the energy of the x-ray as used in the imaging process that acquires the high energy image is used, and the imaging process that acquires the high energy image is executed with an irradiation time period sufficiently long for a sufficient amount of the x-ray to penetrate through the fat examination object P2. According to this method, while an x-ray to be used for imaging has a low penetration power, a sufficient amount of the x-ray is enabled to reach the FPD 12a using a long irradiation time period, so that a preferable high energy image different in contrast from the low energy image can be acquired. In Part (b) of FIG. 8, there is shown an example of the continuous-shot imaging process employing the latter method described above to acquire images of the fat examination object P2. In the example shown in FIG. 8 (Part (b)), for the fat examination object P2, the imaging process that acquires the high energy image is executed by use of an x-ray having an energy of "120 kV" for a long irradiation time period, and the imaging process that acquires the low energy image is executed by use of an x-ray having an energy image "60 kV". In this method, since the irradiation time period of the x-ray in the imaging process that acquires the high energy image is long, a relatively long imaging interval is necessary to execute the continuous-shot imaging process.

As described above and as shown in Part (a) of FIG. 8, in the present embodiment, shortage in the amount of the x-ray reaching the FPD 12a due to the physical constitution of the examination object for the imaging process that acquires the high energy image in the continuous-shot imaging can be compensated for by inputting and specifying a relatively high energy level for the imaging conditions. In this case, a relatively long imaging interval is input and specified for the imaging conditions. The relatively high energy level to be input and specified is determined by the user through visual checking the physical constitution of the examination object. Further, the imaging interval is selected by the user from among the preliminarily provided imaging intervals in correspondence to the energy level in the corresponding imaging process.

As described above, the imaging conditions are appended to the medical images acquired through the imaging process. In addition, at step S102 in the flowchart of FIG. 7, the imaging time intervals in the continuous-shot imaging process performed to acquired two medical images G1 and G2 are acquired by the time difference recognition section 120 from the appended imaging conditions. The imaging time intervals thus acquired are transferred to the parameter determination section 130.

Subsequently, in the parameter determination section 130, values corresponding to the imaging time intervals are set into the global matching section 140, which performs a global matching process, and the local matching section 150 (at step S103), which performs a local matching process. The values are thus set as below-mentioned parameter values that are used in the global matching process and the local matching process, which are described further below. Before describing details regarding the setting of the parameter values at step S103, the contents of the global matching process (step S104) and the global matching process (step S200), which are executed subsequently to the setting, will be described below.

The global matching process (step S104) is a process that rotationally move or parallelly move the second medical image G2 relative to the first medical image G1, thereby to generally matching the second medical image G2 with the first medical image G1. With the global matching process, rough or global position-matching of the second medical image G2 with the first medical image G1 is carried out. This generally prevents, for example, mismatches that can uniformly appear over the overall image because of, for example, fluctuation in the posture of the examination object between the first and second shots of the continuous-shot imaging process.

In the present embodiment, the rotational movement is performed in accordance with an affine transformation, which is one example of the linear coordinate transformation with respect to the image. Further, the parallel movement, which is another example of the linear coordinate transformation with respect to the image, is performed in a direction described below.

Part (a) and part (b) of FIG. 9 respectively show the rotational and parallel movements of the second medical image G2 relative to the first medical image G1.

More specifically, Part (a) of FIG. 9 shows the manner of the rotational movement of the second medical image G2 relative to the first medical image G1, and Part (b) of FIG. 9 shows the manner of the parallel movement of the second medical image G2 relative to the first medical image G1.

As shown in Part (a) of FIG. 9, in the global matching process, the rectangular second medical image G2 is rotationally moved about a center point G2_1 on the lower side. In this event, the rotational movement is limited to an angular range D1, in which the second medical image G2 is rotationally moved to an angle to best match with the first medical image G1 within the angular range D1. The degree of the match between the first and second medical images G1 and G2 is represented by the sum of differences of the pixel values between the first and second medical images G1 and G2. In the rotational movement, the second medical image G2 is rotationally moved within the angular range D1 to an angle at which the sum of differences of the pixel values is minimum.

As shown in Part (b) of FIG. 9, in the global matching process, the rectangular second medical image G2 is moved in parallel to the lower side thereof. In this event, the parallel movement is limited within a movement range D2, in which the second medical image G2 is parallely moved within the movement range D2 to a position at which the sum of differences of the pixel values from the first medical image G1 is minimum.

Thus, in the global matching process (step S104) in the flowchart of FIG. 7, the global position-matching of the second medical image G2 with the first medical image G1 is performed through the rotational movement and parallel movement described above. In the process of step S103 previous to the global matching process, the angular range D1 and the movement range D2 are set to the values corresponding to the imaging time intervals as parameters related to the global matching process, as described further below.

Upon termination of the global matching process (step S104), a post-global position-matching second medical image G2a produced after the global matching process is transferred to the local matching section 150.

The local matching section 150 executes the local matching process (step S200) that matches the post-global position-matching second medical image G2a with the first medical image G1 through deformation described further below. The local matching process is a process to achieve the purpose of preventing local mismatches that cannot be completely prevented through the uniform matching process in the global matching process.

FIG. 10 shows a detailed flowchart of the local matching process (step S200) shown in FIG. 7.

In the local matching process, a shift vector described below is first calculated (shift vector calculation process) (at step S210).

FIG. 11 shows schematic views of the shift vector calculation process.

In the shift vector calculation process, as shown in Part (a) of FIG. 11, square regions of interest (ROI's) having a size of N pixels×N pixels are at the identical pitches in the first medical image G1. Each of the ROI to be set in the process of step S220 will be referred to as an "initial template" denoted by reference numeral 151.

Subsequently, as shown in Part (b) of FIG. 11, in the post-global position-matching second medical image G2a, an initial search range 152 having a size of (N+A1) pixels×(N+A1) pixels is set with the center in a position corresponding to the center of the respective initial template 151.

Then, an initial matching portion 153 best matching the initial template 151 of the first medical image G1 is searched for within the initial search range 152. The match in this case is represented by a sum of differences of the pixel values between the initial template 151 and an image region of a comparison target. In the search for an initial matching portion 153, an image region in which the sum of differences of the pixel values is minimum within the initial search range 152 is searched for as the initial matching portion 153.

In the local matching section 150, in the case where the number of iterations described below is set to two or more, a process described below is executed subsequent to search for initial matching portions 153.

In this case, when the initial matching portions 153 have been searched for, then, as shown in Part (a) of FIG. 11, secondary templates 154 are set in the first medical image G1. Each secondary template 154 is concentric with the initial template 151 corresponding to the initial matching portion 153 and each have a size of (N−A2) pixels×(N−A2) pixels, which is reduced therefrom by a predetermined amount. Further, a secondary search range 155 having a size of (N−A2+A1) pixels×(N−A2+A1) pixels is set around the center of each of the initial matching portions 153. Then, as shown in Part (a) of FIG. 11, in the secondary search range 155, a secondary matching portion 156 best matching with the secondary templates 154 of the first medical image G1 is searched for.

In the shift vector calculation process (step S210) in the flowchart of FIG. 10, the size reduction and setting of the template, setting of the search range, and the search for the matching portion are iterated. In the process of step S103, which is shown in the flowchart of FIG. 7 and which is executed before the shift vector calculation process, the number of iterations of the operations such as the search, the size of the initial template, and the size of the search range are set to values regarding the local matching process as parameters corresponding to the imaging time intervals, as described further below.

In the example shown in Part (b) of FIG. 11, the number of iterations is set to two. In this case, when the secondary matching portion 156 has been searched for, a vector extending to the center of the initial search range 152 from the center of the secondary matching portion 156 is calculated as a shift vector Sb for the initial template 151. The shift vector Sb represents a local deformation direction and deformation amount necessary for matching the post-global position-matching second medical image G2a with the first medical image G1 with respect to the initial template 151.

In the shift vector calculation process (step S210) in the flowchart of FIG. 10, the calculation of the shift vector Sb is executed for all initial templates 151 in the first medical image G1.

Upon termination of the calculation of the shift vectors Sb, the calculation of shift vectors for the respective pixels constituting the post-global position-matching second medical image G2a is executed through an interpolation calculation (process) described below (step S220). Then, the post-global position-matching second medical image G2a is deformed through a warping process (step S230) in accordance with the calculated shift vectors for the pixels (or, "pixel shift vectors", below).

FIG. 12 includes schematic views respectively showing the process of calculation of pixel shift vectors and the warping process in accordance with the pixel shift vectors.

More specifically, Part (a) of FIG. 12 shows the pixel shift vector calculation process through the interpolation calculation process, and Part (b) of FIG. 12 shows the warping process.

As shown in Part (a) of FIG. 12, in the pixel shift vector calculation process (step S220), a four-point interpolation calculation process is execution using four shift vectors Sb_1 to Sb_4 respectively obtained for four initial templates 151.

Thereby, the calculation process is performed for a shift vector Pb of each pixel P1 in a square surrounded by four points corresponding to the centers of the four initial templates 151 in the post-global position-matching second medical image G2a. The shift vector Pb represents the shift direction and the shift amount necessary to shift a pixel P1' corresponding to an initiation point of the shift vector Pb to a position of the pixel P1 corresponding to a termination point of the shift vector Pb.

The respective pixel shift vector obtained through the four-point interpolation calculation process can contain, for example, an image state of the medical image, calculative search error occurred in the search for the matching portions, and calculation error occurred in the four-point interpolation calculation process, thereby causing turbulence and inconsistency in the inter-shift vector continuity.

Then, after calculation of the shift vectors for the all pixels constituting the post-global position-matching second medical image G2a through the pixel shift vector calculation process (step S220), the array of the respective pixel shift vectors is first adjusted by compensation using a polynomial approximation technique in the warping process (step S230).

Then, in the warping process (step S230), after compensation such as described above, pixels at the initiation points of the respective shift vectors are shifted in accordance with the post-compensation shift vectors. As a consequence, as shown in Part (b) of FIG. 11, the post-global position-matching second medical image G2a is smoothly deformed, thereby making it possible to acquire the post-process processed second medical image G2' matched in the unit of the pixel with the first medical image G1.

As described above, when the series of processes to and including the warping process in the flowchart of FIG. 10 (step S230) is completed, the local matching process (step 200) in the flowchart of FIG. 7 is completed, and the processes shown in the flowchart shown in FIG. 7 terminates.

Then, the post-process second medical image G2' acquired through the processes as described above is transferred together with the first medical image G1 to the ES processing device 50, and subjected to the ES process therein.

As described above, in the process of step S103 in the flowchart of FIG. 7, as the parameters for the local matching process (step 200), the angular range D1 of the rotational movement in accordance with the affine transformation (refer to FIG. 9) and the movement range D2 of the parallel movement in accordance with the parallel movement process (refer to FIG. 9) are set to the values corresponding to the imaging time intervals in the continuous-shot imaging process. In addition, as the parameters for the local matching process, the number of iterations of the search, the size of the initial template, and the size of the search range are set to the values corresponding to the imaging time intervals. The values of the respective parameters will be described below.

In the present embodiment, a correlation table in which respective imaging time intervals and respective sets of values of parameters are correlated to one another is stored in predetermined memory. In the process of step S103 in the flowchart of FIG. 7, the parameter determination section 130 reads out the correlation table, and then sets, in the correlation table, the values of the respective parameters correlated to the imaging time intervals transferred from the time difference recognition section 120 into the global matching section 140 and the local matching section 150.

FIG. 13 is a view showing, by way of example, a correlation table T1 in which respective imaging time intervals and a set of values of parameters are correlated to one another.

As can be seen from the correlation table T1 shown in FIG. 13, the angular range of the rotational movement and the movement range of the parallel movement, which are the parameters for the global matching process, are both correlated to the corresponding imaging time interval so as to be wider as the imaging time interval is longer. That is, the respective ranges are correlated to the imaging time interval so as to be wider. The correlation is thus provided for the reason described hereinbelow. The degree of movement or the like of an examination object increases as the imaging time interval increases, such that, as a consequence, also the probability of increase in the amount of mismatches increases is higher. In order to cancel such a high amount of mismatches, it is effective to move the second medical image in a wide range. Further, in the correlation table T1, wide ranges are not invariantly correlated to the imaging time intervals. Such correlations are provided to prevent such cases where, depending upon the image state, a position with a better matchability than a position necessary to be inherently detected is incidentally detected in an unnecessarily wide range. Further, the process period of time necessary for the global matching process depends upon the area sizes of the angular range and the movement range, for example. As such, in the present embodiment, the global matching process is executed in an appropriate process period of time in accordance with the imaging time interval.

Further, in the correlation table T1, among the parameters regarding local matching process, the size of the initial template is correlated to the corresponding imaging time interval so as to be shorter as the imaging time interval is longer. In a case where the difference between imaging times is large to the extent of increasing the amount of image mismatches, the mismatch states may be different in respective portions. Hence, it is preferable to execute a matching process utilizing even more local nonlinear deformation. On the other hand, when the difference between the imaging times is small and hence the amount of image mismatches is small, a large number of portions in similar mismatch states are present in the image. Hence, it is preferable to execute a matching process utilizing even more comprehensive deformation. According to the present embodiment, the local matching process is executed by use of the initial template smaller as the imaging time interval is longer, so that the matching process effectively corresponding to diversity in the image mismatch state can be executed. Further, since the process period of time necessary for the local matching process depends on the area size of the initial template, the local matching process is executed in an appropriate process period of time corresponding to the imaging time interval.

Further, in the correlation table T1, among the parameters regarding local matching process, the size of the search range is correlated to the corresponding imaging time interval so as to be shorter as the imaging time interval is longer. In a case where the difference between imaging times is large and hence the amount of image mismatches is large, there is a high probability that such matching portions are present far apart from the start point of the search, so that it is preferable to execute a search in a larger range. On the other hand, in a case where the difference between imaging times is small and hence the amount of image mismatches is small, there is a high probability that such matching portions are present near the start point of the search, so that it is preferable to execute a search in a more limited range.

According to the present embodiment, the search is performed in the appropriately wide search range corresponding to the imaging time difference (imaging time interval) shown in the correlation table T1. This prevents undesirable cases such as, for example, a case where a matching portion to be detected falls out of the search range and a case where a different portion with a better matchability than a matching portion to be detected is incidentally detected, consequently enabling the matching process with even higher accuracy to be executed. Further, since the process period of time necessary for the local matching process depends also on the area size of the initial template, the local matching process is executed in an appropriate process period of time corresponding to the imaging time interval.

Further, in the correlation table T1, of the parameters for the local matching process, the respective number of iteration is correlated to the imaging time interval so as to increase as the imaging time interval is longer. This enables prevention undesirable incidents, such as search insufficiency in the case where the imaging time difference is large, and unnecessary search iterations in the case where, conversely to the above, the imaging time difference is small and the amount of image mismatches is small. Consequently, the local matching process can be executed with high accuracy and efficiency.

According to the present embodiment, since the respective parameters are set to the appropriate values, two medical images can be matched with each other with high accuracy.

In the above, as one embodiment of the image processing device of the present invention, the image processing device in which only one of two medical images is deformed, and the one image is matched to the other image is exemplified, but the present invention is not limited thereto. For example, the image processing device of the present invention may be of the type in which such two images are both deformed, and the two images are matched with each other.

Further, in the above, as one embodiment of the image processing device of the present invention, the image processing device in which two medical images to be subjected to the ES process are matched with each other is exemplified, but the present invention is not limited thereto. The present invention can be applied not only to the above-described, but generally to processes that match two medical images acquired through continuous-shot imaging process with each other.

Further, in the above, as one embodiment of the image processing device of the present invention, the image processing device including the global matching section that executes the rough or global matching through the rotational movement and the parallel movement is exemplified, but the present invention is not limited thereto. For example, the image processing device may be of the type that includes a global matching section that executes global matching of an image by linearly deforming the image.

What is claimed is:

1. An image processing device comprising:
   an image receiving section that receives a first photographic image and a second photographic image of a same examination object, the first and second photographic images being imaged at imaging times different from each other;
   a time difference acquiring section that acquires a time difference between the imaging times of the first and second photographic images;
   a processing section that (a) determines a plurality of reference image portions in the first photographic image each of which is composed of a same number of pixels and has a same predetermined shape, (b) determines a plurality of search ranges in the second photographic image each of which is composed of more than the same number of pixels, and which have respectively centers at a plurality of positions in the second photographic image corresponding to positions of centers of the same predetermined shapes of the plurality of reference image portions respectively, (c) obtains two or more comparison image portions in each of the plurality of search ranges each comparison image portion of which is composed of a same number of pixels as the same number of pixels in each of the plurality of reference image portions and has the same predetermined shape, (d) obtains a sum of differences between pixel values of pixels in each of the two or more comparison image portions in the each of the plurality of search ranges, and pixel values of pixels in one of the plurality of reference image portions that has a center at a position in the first photographic image corresponding to a position of a center of the each of the plurality of search ranges, (e) determines, as a matching image portion, one of the two or more comparison image portions which has the smallest sum of differences of the two or more comparison image portions, (f) obtains a vector which connects a center of the matching image portion and the center of the each of the plurality of search ranges, and (g) performs a matching processing on the second photographic image to match the second photographic image with the first photographic image by locally deforming the second photographic image by amounts of local deformation along local deformation directions each of which is calculated by using the obtained vector as a first approximation to the each of the amounts of local deformation along the local deformation directions; and
   a parameter setting section that sets, to the processing section as the same number which represent a number of pixels composing each of the plurality of reference image portions, a number that is varied in accordance with the time difference in such a manner that the larger the time difference is, the smaller the number is.

2. The image processing device according to claim 1, wherein each of the plurality of search ranges is composed of a same number of pixels, and
   the parameter setting section sets, to the processing section as the same number which represent a number of pixels composing each of the plurality of search ranges, a number that is varied in accordance with the time difference in such a manner that the larger the time difference is, the larger the number is.

3. The image processing device according to claim 1, wherein the processing section searches for matching parts in one of the two photographic images that pictorially and respectively match predetermined parts in the other of the two images, and transforms one or both of the two photographic images at each portion of the image to align the matching parts with the predetermined parts, the searching for the matching parts being repeated by changing an area size of the predetermined parts for the number of times set as the parameter value; and
   the parameter setting section sets the number of times for searching the matching parts to be larger as the difference between the imaging times is larger.

4. The image processing device according to claim 1, wherein the processing section moves or deforms the one or both of the two photographic images by using a linear coordinate transformation for an image to match the two photographic images, an amount of the movement and the deformation being within a permissible range set as the parameter value; and
   the parameter setting section sets the permissible range to be larger as the difference between the imaging times is larger.

5. A non-transitory computer-readable medium storing an image processing program that is incorporated executed in a computer and causes the computer to operate as an image processing apparatus, the image processing apparatus comprising:

an image receiving section that receives a first photographic image and a second photographic image of a same examination object, the first and second photographic images being imaged at imaging times different from reach other;

a time difference acquiring section that acquires a time difference between the imaging times of the first and second photographic images;

a processing section that (a) determines a plurality of reference image portions in the first photographic image each of which is composed of a same number of pixels and has a same predetermined shape, (b) determines a plurality of search ranges in the second photographic image each of which is composed of more than the same number of pixels, and which have respectively centers at a plurality of positions in the second photographic image corresponding to positions of centers of the same predetermined shapes of the plurality of reference image portions respectively, (c) obtains two or more comparison image portions in each of the plurality of search ranges each comparison image portion of which is composed of a same number of pixels as the same number of pixels in each of the plurality of reference image portions and has the same predetermined shape, (d) obtains a sum of differences between pixel values of pixels in each of the two or more comparison image portions in the each of the plurality of search ranges, and pixel values of pixels in one of the plurality of reference image portions that has a center at a position in the first photographic image corresponding to a position of a center of the each of the plurality of search ranges, (e) determines, as a matching image portion, one of the two or more comparison image portions which has the smallest sum of differences of the two or more comparison image portions, (f) obtains a vector which connects a center of the matching image portion and the center of the each of the plurality of search ranges, and (g) performs a matching processing on the second photographic image to match the second photographic image with the first photographic image by locally deforming the second photographic image by amounts of local deformation along local deformation directions each of which is calculated by using the obtained vector as a first approximation to the each of the amounts of local deformation along the local deformation directions; and a parameter setting section that sets, to the processing section as the same number which represent a number of pixels composing each of the plurality of reference image portions, a number that is varied in accordance with the time difference in such a manner that the larger the time difference is, the smaller the number is.

* * * * *